(12) United States Patent
Takeda et al.

(10) Patent No.: US 12,219,523 B2
(45) Date of Patent: Feb. 4, 2025

(54) TERMINAL AND COMMUNICATION METHOD

(71) Applicant: NTT DOCOMO, INC., Tokyo (JP)

(72) Inventors: Daiki Takeda, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 347 days.

(21) Appl. No.: 17/762,598

(22) PCT Filed: Sep. 25, 2019

(86) PCT No.: PCT/JP2019/037712
§ 371 (c)(1),
(2) Date: Mar. 22, 2022

(87) PCT Pub. No.: WO2021/059414
PCT Pub. Date: Apr. 1, 2021

(65) Prior Publication Data
US 2022/0346057 A1    Oct. 27, 2022

(51) Int. Cl.
*H04W 68/00* (2009.01)
*H04L 5/00* (2006.01)
(Continued)

(52) U.S. Cl.
CPC ........... *H04W 68/00* (2013.01); *H04L 5/0005* (2013.01); *H04W 72/0446* (2013.01);
(Continued)

(58) Field of Classification Search
CPC ............. H04W 68/00; H04W 72/0446; H04W 72/0453; H04W 72/21; H04W 52/0229; H04W 72/23; H04L 5/0005; H04L 5/0051
(Continued)

(56) References Cited

U.S. PATENT DOCUMENTS

| | | | | |
|---|---|---|---|---|
| 10,708,912 B2* | 7/2020 | Huang | ................... | H04L 5/0053 |
| 2020/0022082 A1* | 1/2020 | Ljung | ................. | H04J 13/0048 |

(Continued)

OTHER PUBLICATIONS

Extended European Search Report issued in counterpart European Patent Application No. 19946608.7, mailed on Aug. 28, 2023 (14 pages).

(Continued)

*Primary Examiner* — Don N Vo

(74) *Attorney, Agent, or Firm* — Osha Bergman Watanabe & Burton LLP

(57) ABSTRACT

A terminal includes a receiver that receives, from a base station, configuration information for at least one of a first activation signal or a second activation signal associated with a paging occasion; a controller that determines, based on the configuration information, a time/frequency domain position of resources on which the first activation signal or the second activation signal is allocated; and a communication unit that receives the first activation signal or the second activation signal on the resources and receives, from the base station, paging associated with the received first activation signal or second activation signal, wherein the controller determines the time/frequency domain position of the resources on which the first activation signal and the second activation signal is allocated, by associating the positions of the resources.

4 Claims, 17 Drawing Sheets

(51) Int. Cl.
*H04W 72/0446* (2023.01)
*H04W 72/0453* (2023.01)
*H04W 72/21* (2023.01)
*H04W 52/02* (2009.01)

(52) U.S. Cl.
CPC ....... *H04W 72/0453* (2013.01); *H04W 72/21* (2023.01); *H04W 52/0229* (2013.01)

(58) Field of Classification Search
USPC .......................................................... 455/458
See application file for complete search history.

(56) References Cited

U.S. PATENT DOCUMENTS

| | | | |
|---|---|---|---|
| 2020/0029302 A1* | 1/2020 | Cox ................... | H04W 52/0216 |
| 2020/0169956 A1* | 5/2020 | Sun ....................... | H04W 24/08 |
| 2020/0195358 A1* | 6/2020 | Yokomakura ..... | H04W 36/0094 |
| 2021/0136687 A1* | 5/2021 | Liu ....................... | H04W 72/00 |
| 2021/0385034 A1* | 12/2021 | Hwang ................. | G16Y 10/75 |

OTHER PUBLICATIONS

Qualcomm Incorporated; "PDCCH-based power saving channel design"; 3GPP TSG-RAN WG1 #98, R1-1909275; Prague, Czech Republic; Aug. 26-30, 2019 (11 pages).
International Search Report issued in PCT/JP2019/037712 on Apr. 7, 2020 (3 pages).
Written Opinion of the International Searching Authority issued in PCT/JP2019/037712 on Apr. 7, 2020 (4 pages).
Lenovo, Motorola Mobility; "UE-group wake-up signal for Rel-16 MTC"; 3GPP TSG RAN WG1 Meeting #97, R1-1906277; Reno, USA; May 13-17, 2019 (7 pages).
3GPP TS 36.211 V15.6.0; "3rd Generation Partnership Project; Technical Specification Group Radio Access Network; Evolved Universal Terrestrial Radio Access (E-UTRA); Physical channels and modulation (Release 15)"; Jun. 2019 (239 pages).
3GPP TS 38.300 V15.6.0; "3rd Generation Partnership Project; Technical Specification Group Radio Access Network; NR; NR and NG-RAN Overall Description; Stage 2 (Release 15)"; Jun. 2019 (99 pages).

* cited by examiner

FIG.17
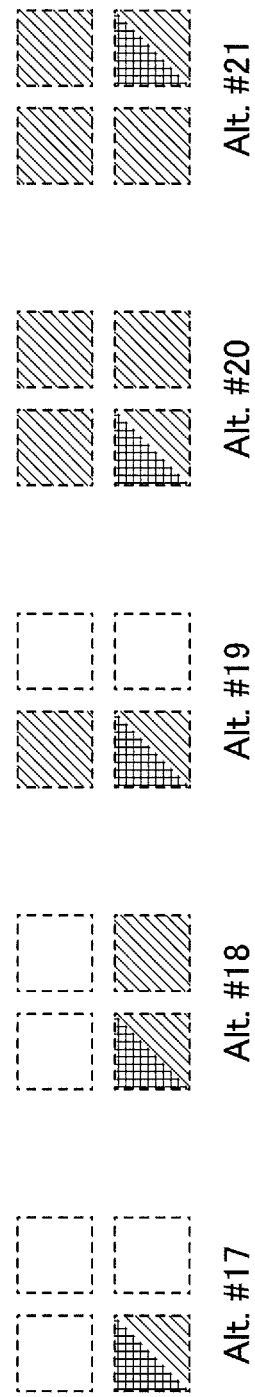
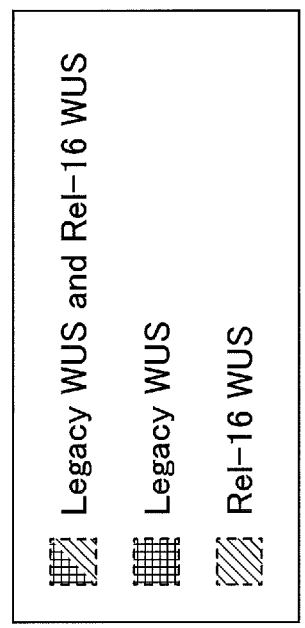

TERMINAL AND COMMUNICATION METHOD

TECHNICAL FIELD

The present invention relates to a terminal and a communication method in a radio communication system.

BACKGROUND ART

In New Radio (NR) (which is also referred to as "5G") that is a successor system to Long Term Evolution (LTE), technology has been studied that meets the requirements, such as a requirement on large capacity system, a requirement on a high data transmission rate, a requirement on low latency, a requirement on simultaneous connection of multiple terminals, a requirement on low cost, and a requirement on power saving (for example, Non-Patent Document 1).

Furthermore, in the 3rd Generation Partnership Project (3GPP), extension of the technology for Internet of Things (IoT) based on LTE has also been studied. For example, for the purpose of power saving of a IoT-UE (user equipment), that is, a UE corresponding to Narrow Band IoT (NB-IoT) or enhanced Machine Type Communication (eMTC), a wake-up signal (WUS) which is also called an activation signal has been introduced in LTE-IoT of Release 15 (for example, Non-Patent Document 2).

RELATED ART DOCUMENT

Non-Patent Document

Non-Patent Document 1: 3GPP TS 38.300 V15.6.0 (2019-06)
Non-Patent Document 2: 3GPP TS 36.211 V15.6.0 (2019-06)

SUMMARY OF THE INVENTION

Problem to be Solved by the Invention

As for a resource for transmitting a WUS from a base station and for receiving the WUS by a terminal (e.g., time resources, frequency resources, or time and frequency resources), a flexible arrangement has been studied in Release 16 (Rel-16), in addition to a fixed arrangement according to related art. Furthermore, it is desirable to flexibly configure whether coexistence of a Rel 15 WUS (legacy WUS) and a Rel-16 WUS in a same resource is allowed.

The present invention has been accomplished in view of the above-described point, and an object is to flexibly arrange an activation signal in a radio communication system.

Means for Solving the Problem

According to the disclosed technology, there is provided a terminal including a receiver that receives, from a base station, configuration information for at least one of a first activation signal or a second activation signal, the at least one of the first activation signal or the second activation signal being associated with a paging occasion; a controller that determines, based on the configuration information, a first time/frequency domain position of a first resource on which the first activation signal is allocated or a second time/frequency domain position of a second resource on which the second activation signal is allocated; and a communication unit that receives the first activation signal on the first resource or the second activation signal on the second resource and receives, from the base station, paging associated with the received first activation signal or the received second activation signal, wherein the controller determines the first time/frequency domain position of the first resource on which the first activation signal is allocated and the second time/frequency domain position of the second resource on which the second activation signal is allocated by associating the first time/frequency domain position of the first resource on which the first activation signal is allocated with the second time/frequency domain position of the second resource on which the second activation signal is allocated.

Advantage of the Invention

According to the disclosed technology, an activation signal can be flexibly arranged in a radio communication system.

BRIEF DESCRIPTION OF DRAWINGS

FIG. 17 is a diagram illustrating an example (3) of a WUS arrangement according to an embodiment of the present invention;

EMBODIMENTS OF THE INVENTION

Figure 1:
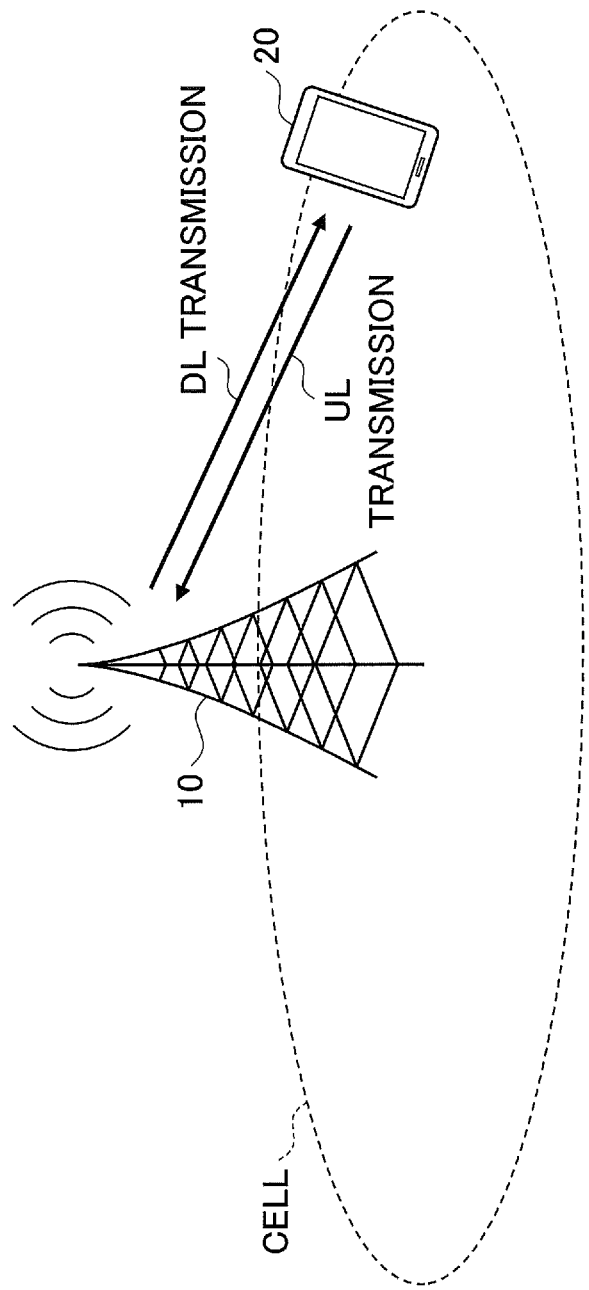
FIG. 1 is a diagram illustrating a configuration example of a radio communication system according to an embodiment of the present invention.

In the following, embodiments of the present invention are described by referring to the drawings. Note that the embodiments described below are an example, and embodiments to which the present invention is applied are not limited to the following embodiments.

In an operation of a radio communication system of an embodiment of the present invention, existing technology is appropriately used. Here, the existing technology is, for example, existing LTE but not limited to the existing LTE. Furthermore, the term "LTE" used in this specification has a broad meaning including LTE-Advanced and a system subsequent to LTE-Advanced (for example, NR), unless as otherwise specified.

In the embodiments of the present invention described below, terms used in the existing LTE are used, such as Synchronization signal (SS), Primary SS (PSS), Secondary SS (SSS), Physical broadcast channel (PBCH), Physical random access channel (PRACH), and the like. This is for convenience of description, and signals, functions, and the like, similar to these may be referred to by other names. The above-described terms in NR correspond to NR-SS, NR-PSS, NR-SSS, NR-PBCH, NR-PRACH, and the like. However, even if a signal is used for NR, the signal is not always specified as "NR—."

In the embodiments of the present invention, a duplex method may be a Time Division Duplex (TDD) method, an Frequency Division Duplex (FDD) method, or any other method (e.g., Flexible Duplex, etc.).

In the embodiments of the present invention, "configuring" a radio parameter, or the like, may be "pre-configuring" a predetermined value, or configuring a radio parameter transmitted from a base station 10 or a terminal 20.

FIG. 1 is a diagram illustrating an example of a configuration of a radio communication system according to an embodiment of the present invention. As illustrated in FIG. 1, the radio communication system according to the embodiment of the present invention includes a base station 10 and a terminal 20. In FIG. 1, one base station 10 and one terminal 20 are illustrated. However, this is an example, and there may be a plurality of base stations 10 and a plurality of terminals 20.

The base station 10 provides one or more cells, and the base station 10 is a communication device for performing radio communication with the terminal 20. A physical resource of a radio signal may be defined in a time domain and a frequency domain, the time domain may be defined in terms of a number of OFDM symbols, and the frequency domain may be defined in terms of a number of subcarriers or a number of resource blocks. The base station 10 transmits a synchronization signal and system information to the terminal 20. The synchronization signal is, for example, NR-PSS and NR-SSS. The system information is transmitted, for example, on a NR-PBCH, and the system information is also referred to as broadcast information. As illustrated in FIG. 1, the base station 10 transmits a control signal or data to the terminal 20 on DL (Downlink), and the base station 10 receives a control signal or data from the terminal 20 on UL (Uplink). Each of the base station 10 and the terminal 20 can transmit and receive signals by performing beamforming. Furthermore, the base station 10 and the terminal 20 can apply MIMO (Multiple Input Multiple Output) based communication to DL or UL. Furthermore, the base station 10 and the terminal 20 may perform communication through a secondary cell (SCell) and a primary cell (PCell) that are configured based on CA (Carrier Aggregation).

The terminal 20 is a communication device provided with a radio communication function, such as a smartphone, a cellular phone, a tablet, a wearable terminal, a communication module for M2M (Machine-to-Machine), or the like. As illustrated in FIG. 1, the terminal 20 utilizes various communication services provided by a radio communication system by receiving control signals or data in DL from the base station 10 and transmitting control signals or data in UL to the base station 10.

As described above, various types of terminals can be used as the terminal 20, but the terminal 20 according to an embodiment of the present invention is assumed to be mainly an IoT-UE of Release 16 LTE (or Release after Release 16). However, the terminal 20 is not limited to the IoT-UE of Release 16 LTE (or Release after Release 16). Furthermore, the assumed IoT-UE may be an NB-IoT UE or an eMTC UE.

In the radio communication system according to an embodiment of the present invention, the base station 10 transmits a WUS and the terminal 20 monitors the WUS. First, a WUS is described.

Before the introduction of the WUS, the terminal 20 in an idle mode is supposed to monitor each of periodically arriving POs (Paging Occasions). It should be noted that monitoring a PO may be rephrased as monitoring a paging PDCCH or monitoring a paging search space.

During monitoring of a PO, the terminal 20 demodulates DCI transmitted on a PDCCH and checks whether the DCI is directed to the terminal 20. Accordingly, regardless of whether the DCI directed the terminal 20 is transmitted, the terminal 20 is to perform a demodulation operation for each PO, so that it is highly likely that power consumption is wasted. In particular, if a paging PDCCH is transmitted repeatedly, DCI is to be demodulated repeatedly, so that it is highly likely that wasted power consumption is increased.

Accordingly, a WUS has been introduced in Rel-15 LTE-IoT. A WUS in Rel-15 LTE-IoT (a WUS specified in a technical specification of LTE Rel-15) is associated one-on-one with a PO. A resource on which a WUS is transmitted is calculated, for example, from a UE-ID (e.g., IMSI). Furthermore, one bit of a WUS indicates that paging is directed to the terminal 20. A sequence of WUS is calculated from a cell ID, a time position of a PO, or the like, as described in Non-Patent Document 1.

The terminal 20 monitors a WUS resource for a WUS, and, upon detecting the WUS (a sequence specified by a WUS parameter transmitted in system information or the like), the terminal 20 determines that there is paging directed to the terminal 20, and the terminal 20 monitors a PO for a paging PDCCH. That is, the WUS is an activation signal that triggers monitoring of a paging occasion. An operation example related to a WUS of Rel-15 LTE-IoT is described with reference to FIG. 2 and FIG. 3.

Figure 2:
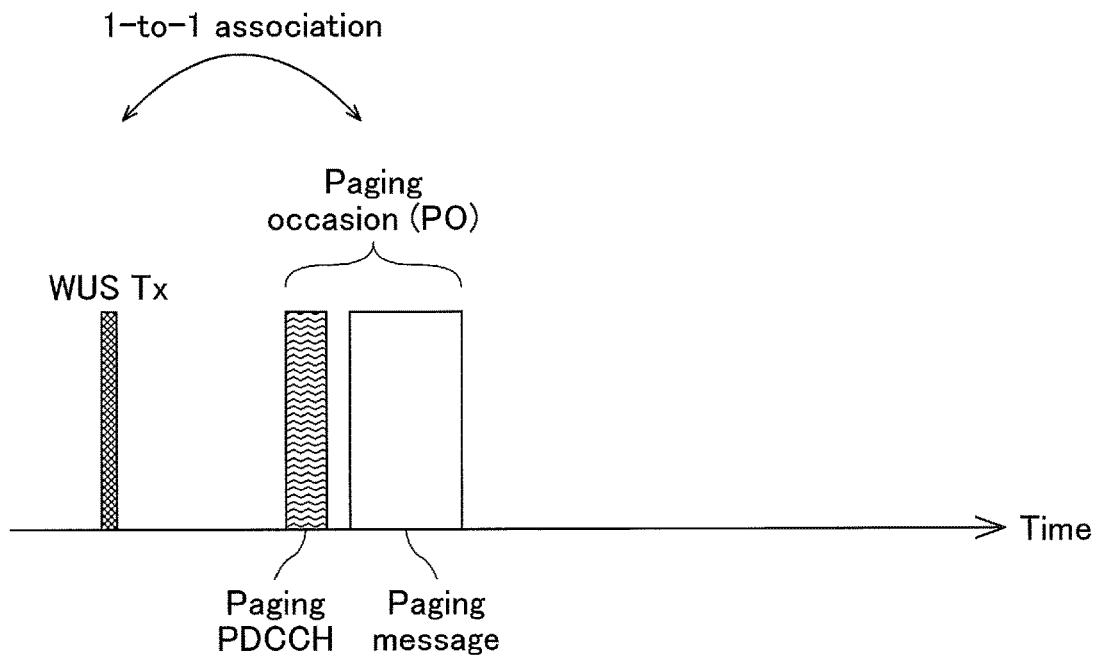
FIG. 2 is a diagram (1) for illustrating a WUS of Rel-15.

FIG. 2 is a diagram (1) for illustrating a WUS of Rel-15. FIG. 2 illustrates an example in which repetitive transmission of a paging PDCCH is not performed. As illustrated in FIG. 2, when the terminal 20 detects a WUS, the terminal 20 monitors a paging PDCCH, and the terminal 20 reads a paging message in response to receiving DCI directed to the terminal 20.

Figure 3:
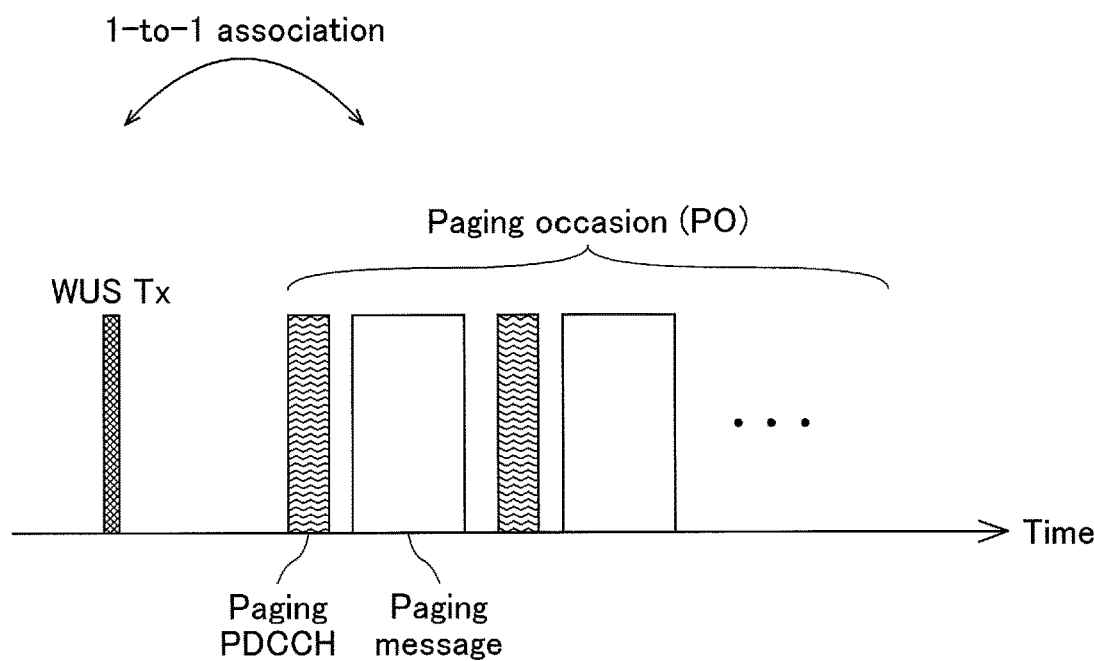
FIG. 3 is a diagram (2) for illustrating the WUS of Rel-15.

FIG. 3 is a diagram (2) for illustrating a WUS of Rel-15. FIG. 3 illustrates an example in which repetitive transmission of a paging PDCCH is performed. When the terminal 20 detects a WUS, the terminal 20 repeatedly monitors paging PDCCHs.

Figure 4:
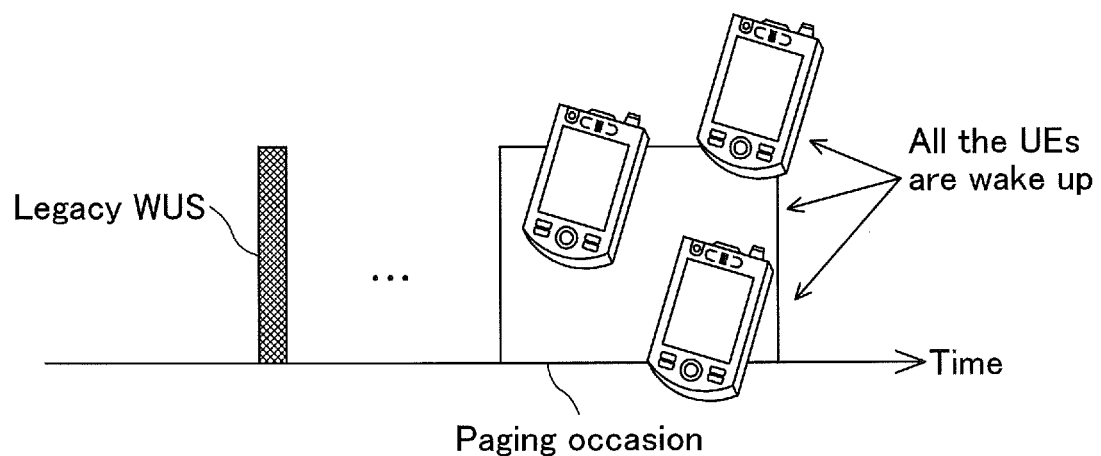
FIG. 4 is a diagram (1) for illustrating a WUS.

FIG. 4 is a diagram (1) for illustrating a WUS. A Rel-15 WUS is associated one-to-one with a PO. Here, the PO is common to the plurality of terminals 20. Accordingly, all the terminals 20 in the Idle mode that detect the WUS are activated and monitor a paging PDCCH. That is, as illustrated in FIG. 4, a large number of the terminals 20 may be activated which may not be the destination of the paging.

Figure 5:
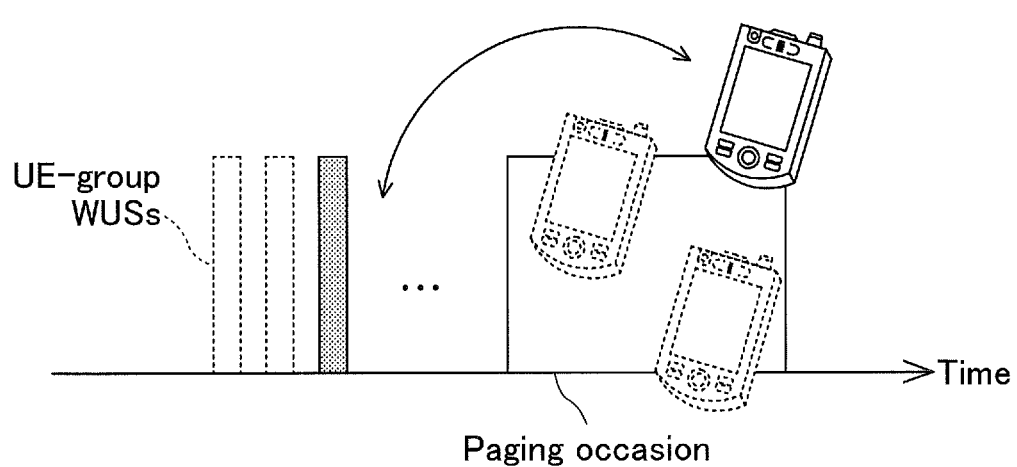
FIG. 5 is a diagram (2) for explaining a WUS.

FIG. 5 is a diagram (2) for illustrating a WUS. In an embodiment of the present invention related to the LTE Rel-16, the terminals 20 are grouped based on a UE-ID or the like. That is, as illustrated in FIG. 5, the terminal 20 belonging to a group only monitors an active WUS of the group. This can reduce the number of the terminals 20 that are activated despite that the terminals are not the destination of the paging.

A group is identified by a UE group ID. The terminal 20 supporting a Rel-16_WUS also supports a WUS of Rel-15. That is, the terminal 20 supporting the Rel-16_WUS can receive a Rel-16_WUS and execute associated processing, and the terminal 20 supporting the Rel-16_WUS can receive a Rel-15 WUS and execute associated processing.

In the following, a WUS of Rel-16 is denoted as a Rel-16_WUS, and a WUS of Rel-15 is denoted as a Legacy WUS. In a case where these are not particularly distinguished, each of these is denoted as a WUS. A legacy WUS may also be referred to as a legacy activation signal.

Furthermore, a UE group ID is used to generate a sequence of a Rel-16_WUS. The number of UE groups can be configured for the terminal 20 by the base station 10. For example, the number of UE groups is broadcasted from the base station 10 by using system information (SIB: System Information Block).

Multiplexing of a Rel-16_WUS and a legacy WUS may be performed by any of the following methods 1)-3) or a combination thereof.
 1) Time division multiplexing (TDM)
 2) Frequency division multiplexing (FDM)
 3) Single sequence Code division multiplexing (CDM)

Multiplexing between multiple WUSs may also be performed by any of the following methods 1)-3) or a combination thereof.
 1) TDM
 2) FDM
 3) Single sequence CDM The single sequence CDM is, for example, a method in which a plurality of WUS sequences is generated by multiplying a base WUS sequence by orthogonal codes, i.e., codes with zero or low cross-correlation, and one of the generated WUS sequences is selected and transmitted.

In the embodiments of the present invention, a method of allocating a WUS resource (a time and frequency resource), which is a resource used by the base station 10 to transmit a WUS to the terminal 20 (the resource monitored by the terminal for the WUS), is described.

In the embodiments of the present invention, up to two WUS resources are configured in each of the time domain and the frequency domain. Here, "configuring" may mean that each WUS resource is configured for the terminal 20 by the base station 10, or may mean that the base station 10 determines each WUS resource.

Furthermore, by using CDM (e.g., single sequence CDM) in a single WUS resource, multiple WUSs may be multiplexed.

Figure 6:
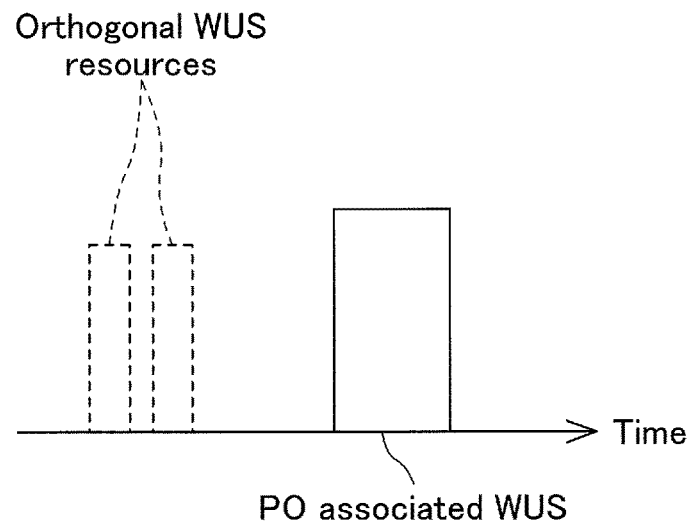
FIG. 6 is a diagram illustrating an example (1) of resource allocation of a WUS according to an embodiment of the present invention.
Figure 7:
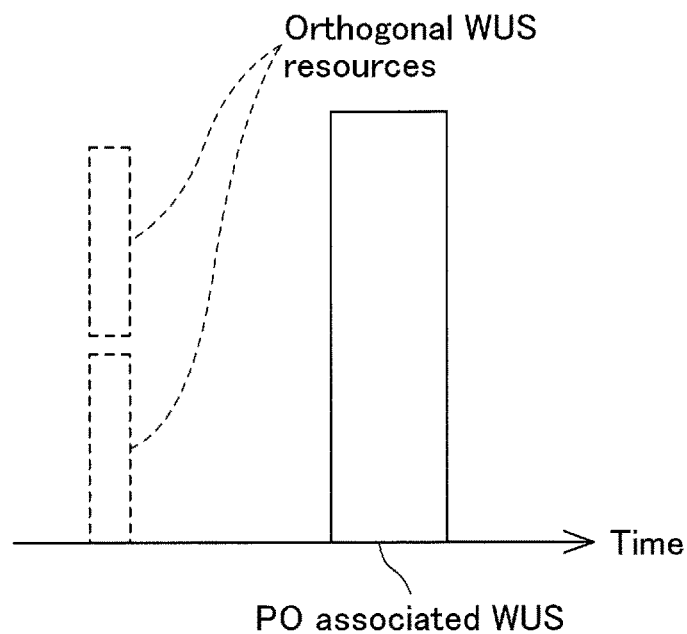
FIG. 7 is a diagram illustrating an example (2) of resource allocation of a WUS according to an embodiment of the present invention.
Figure 8:
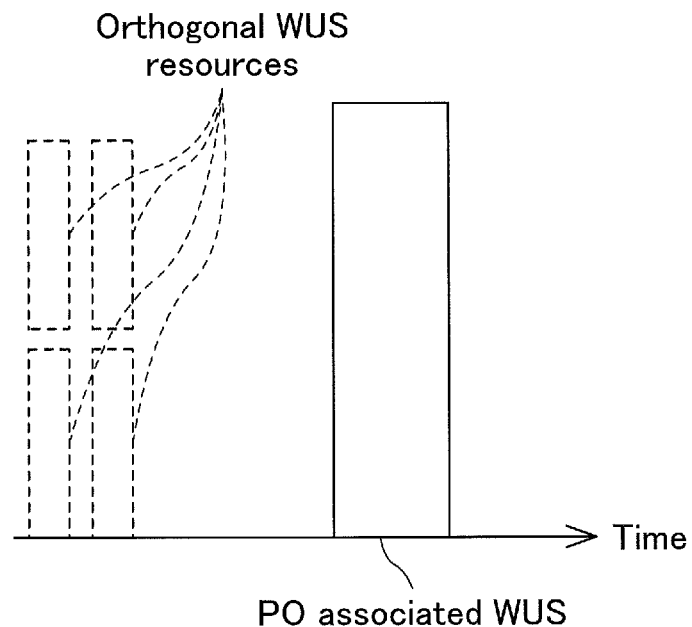
FIG. 8 is a diagram illustrating an example (3) of resource allocation of a WUS according to an embodiment of the present invention.

FIG. 6, FIG. 7 and FIG. 8 illustrate examples where multiple orthogonal WUS resources are configured. In each of the figures, the vertical axis represents a frequency, and the horizontal axis represents time. "Orthogonal" means that the resources are not overlapped.

FIG. 6 illustrates an example in which two WUS resources are configured in the direction of time. FIG. 7 illustrates an example where two WUS resources are configured in the direction of frequency. FIG. 8 illustrates an example where four WUS resources are configured.

By using FIG. 9 through FIG. 13, examples of cases are illustrated in which a Rel-16_WUS or a legacy WUS is transmitted from the base station 10 to the terminal 20. Note that each of FIG. 9 through FIG. 13 illustrates the case where the legacy WUS is allocated on the WUS resource, but the legacy WUS need not be allocated on the WUS resource.

Figure 9:
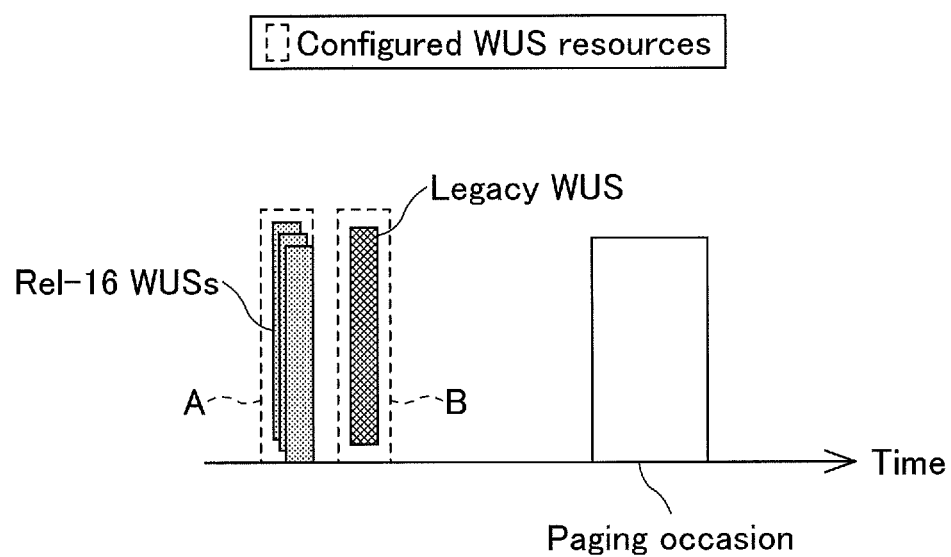
FIG. 9 is a diagram illustrating an example (4) of resource allocation of a WUS according to an embodiment of the present invention.

FIG. 9 is a diagram illustrating an example (4) of resource allocation of a WUS according to an embodiment of the present invention. FIG. 9 illustrates an example in which WUS resource A and WUS resource B are arranged in the direction of time. As illustrated in FIG. 9, multiple Rel-16_WUSs that are code division multiplexed are transmitted on the WUS resource A, and the legacy WUS is transmitted on the WUS resource B. Note that one Rel-16_WUS may be transmitted on the WUS resource A without multiplexing multiple Rel-16_WUSs.

Figure 10:
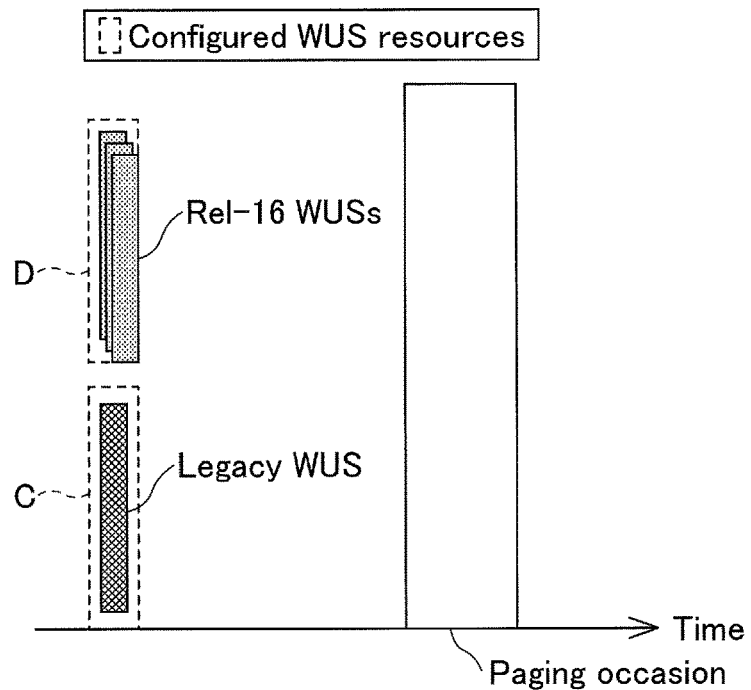
FIG. 10 is a diagram illustrating an example (5) of resource allocation of a WUS according to an embodiment of the present invention.

FIG. 10 is a diagram illustrating an example (5) of resource allocation of a WUS according to an embodiment of the present invention. FIG. 10 illustrates an example where the WUS resource C and the WUS resource D are arranged in the direction of the frequency. As illustrated in FIG. 10, a legacy WUS is transmitted on the WUS resource C and multiple Rel-16_WUSs that are code division multiplexed are transmitted on the WUS resource D. Note that one Rel-16_WUS may be transmitted on the WUS resource D without multiplexing multiple Rel-16_WUSs.

Figure 11:
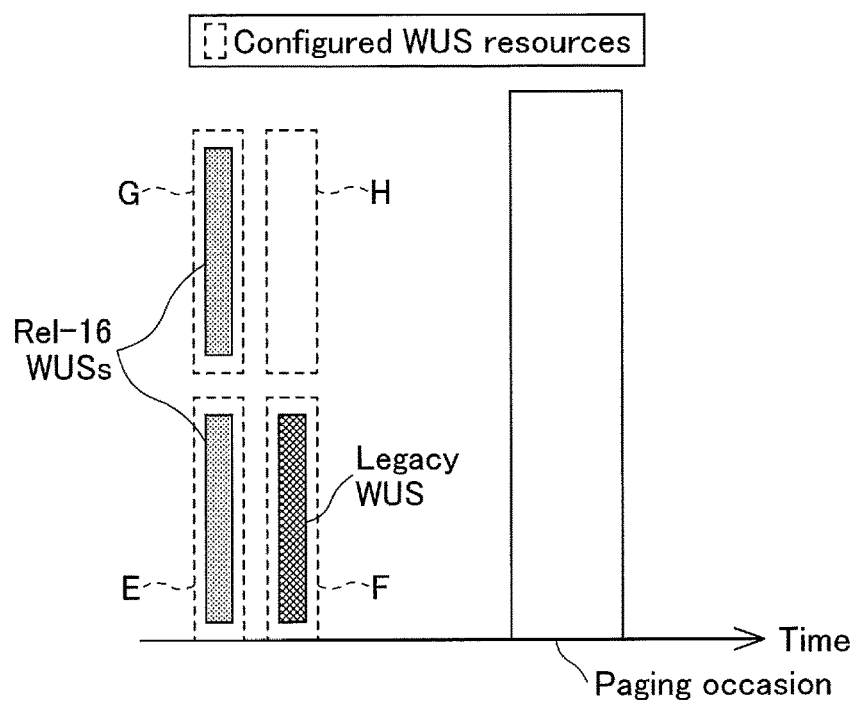
FIG. 11 is a diagram illustrating an example (6) of resource allocation of a WUS according to an embodiment of the present invention.

FIG. 11 is a diagram illustrating an example (6) of resource allocation of a WUS according to an embodiment of the present invention. FIG. 11 illustrates an example in which the WUS resource E, the WUS resource F, the WUS resource G and the WUS resource H are arranged in the direction of time and in the direction of frequency. As illustrated in FIG. 11, Rel-16_WUSs are transmitted on WUS resources E and G, respectively, and the legacy WUS is transmitted on the WUS resource F.

Figure 12:
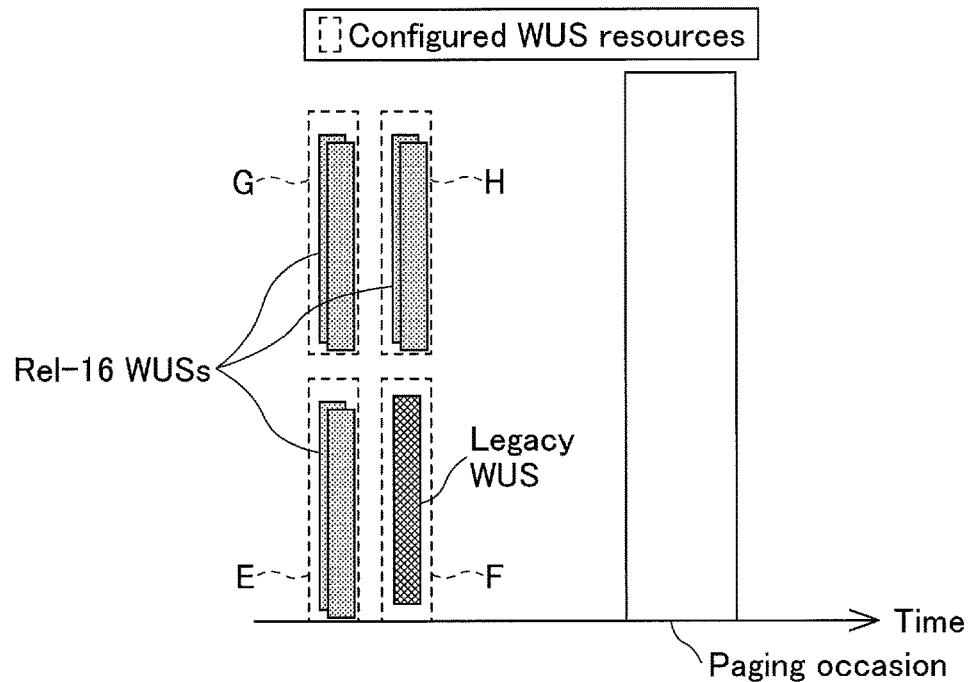
FIG. 12 is a diagram illustrating an example (7) of resource allocation of a WUS according to an embodiment of the present invention.

FIG. 12 is a diagram illustrating an example (7) of resource allocation of a WUS according to an embodiment of the present invention. FIG. 12 illustrates an example in which the WUS resource E, the WUS resource F, the WUS resource G, and the WUS resource H are arranged in the direction of time and in the direction of frequency. As illustrated in FIG. 12, the Rel-16_WUSs are transmitted on WUS resources E and G, respectively, and the legacy WUS is transmitted on the WUS resource F.

Figure 13:
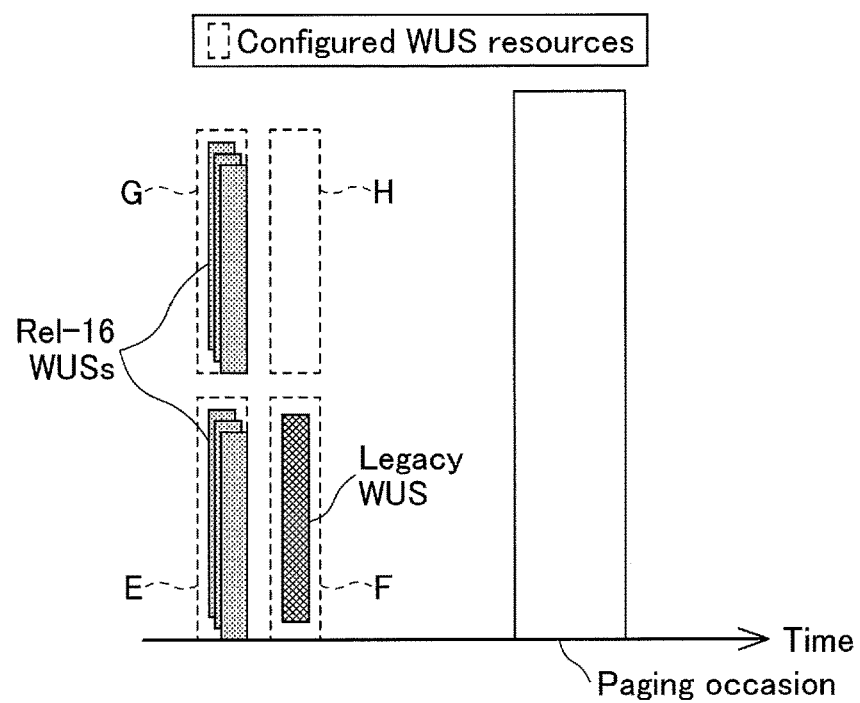
FIG. 13 is a diagram illustrating an example (8) of resource allocation of a WUS according to an embodiment of the present invention.

FIG. 13 is a diagram illustrating an example (8) of resource allocation of a WUS according to an embodiment of the present invention. FIG. 13 illustrates an example in which the WUS resource E, the WUS resource F, the WUS resource G, and the WUS resource H are arranged in the direction of time and in the direction of frequency. As illustrated in FIG. 13, multiple Rel-16_WUSs that are code division multiplexed are transmitted on each of the WUS resource E and the WUS resource G, and the legacy WUS is transmitted on the WUS resource F.

Here, a terminal 20 may monitor only one of the WUS resources specified in time domain and frequency domain. Accordingly, the terminal 20 may detect a WUS in accordance with the following Step 1-Step 3.

Step 1) a UE group ID is configured for the terminal 20 supporting the Rel-16_WUS. The gap setting between a PO and a WUS may also be performed.

Step 2) Based on the configured UE group ID, the terminal 20 determines the location in time domain and frequency domain of the WUS resource to be monitored.

Step 3) The terminal 20 monitors the determined WUS resource in time domain and frequency domain.

For Radio Resource Control (RRC) signaling related to a configuration of a Rel-16_WUS, for example, the terminal 20 supporting the Rel-16_WUS may support signaling related to a Rel-15_WUS. For example, parameters related to WUS transmission timing may be made common between Rel-15 and Rel-16, and efficient signaling may be performed.

Figure 14:
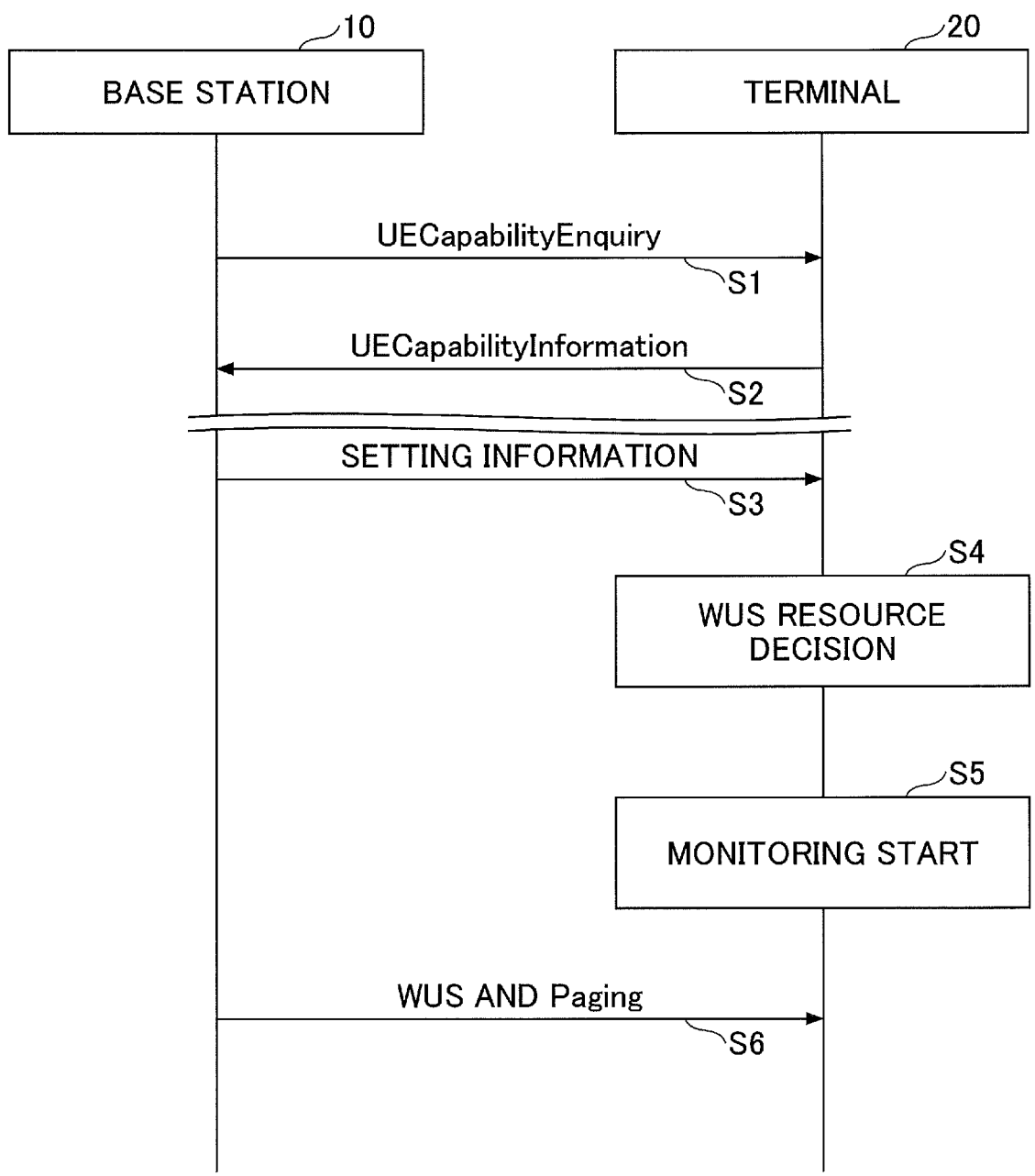
FIG. 14 is a sequence diagram for illustrating an example of monitoring a WUS according to an embodiment of the present invention.

FIG. 14 is a sequence diagram illustrating an example of monitoring a WUS in an embodiment of the present invention. In step S1 illustrated in FIG. 14, the base station 10 transmits a "UECapabilityEnquiry" which means a query of UE capabilities to the terminal 20. Subsequently, in step S2, the terminal 20 transmits a "UECapabilityInformation" which means a UE capability report to the base station 10. "UECapabilityInformation" includes the UE capabilities supported by the terminal 20. The base station 10 identifies the supported UE capabilities based on the received "UECapabilityInformation."

For example, the "UECapabilityInformation" reported to the base station 10 from the terminal 20 in step S2 may include information indicating that the Rel-15_WUS is supported and information indicating that the Rel-16_WUS is supported. It may also include a parameter indicating the shortest gap between the PO associated with the Rel-15_WUS and the Rel-15_WUS, and a parameter indicating the shortest gap between the PO associated with the Rel-16_WUS and the Rel-16_WUS.

In step S3, the base station 10 transmits the configuration information of the WUS to the terminal 20. The configuration information related to the WUS may be system information, for example, "SystemInformationBlockType2" or "SystemInformationBlockType2-NB-r13" or the like. Step S3 may be executed before Steps S1 and S2.

For example, the "configuration information" reported to the terminal 20 from the base station 10 in step S3 may include a parameter indicating the maximum interval length of the Rel-15_WUS and a parameter indicating the maximum interval length of the Rel-16_WUS. Additionally, a parameter indicating the number of consecutive POs associated with the Rel-15_WUS and a parameter indicating the number of consecutive POs associated with the Rel-16_WUS may be included. Additionally, a parameter indicative of the position of the Rel-15_WUS in the frequency domain and a parameter indicative of the position of the Rel-16_WUS in the frequency domain may be included.

Here, if a value common to the Rel-15_WUS is to be set to the configuration of the Rel-16_WUS, such as time offset, time duration, frequency position (Freq. location), the number of POs (numPOs), or the like, the base station 10 need not transmit, to the terminal 20, a notification of the configuration of the Rel-16_WUS. For example, if a notification of the configuration of the Rel-16_WUS is not transmitted, the terminal 20 may use the configuration of the Rel-15_WUS as the configuration of the Rel-16_WUS, as the default operation.

For example, assuming that independent configurations are supported for the Rel-15_WUS and the Rel-16_WUS, a notification of the Rel-16_WUS configuration may be specified as optional.

If, for example, both the notification of the configuration of the Rel-15_WUS and the notification of the configuration of the Rel-16_WUS are transmitted, the configuration of the Rel-16_WUS may be defined based on the configuration of the Rel-15_WUS. For example, the time offset may be the same as the time position of the Rel-15_WUS, or it may be an offset based on the time position of the Rel-15_WUS. For example, the period and the number of POs may be the same values as those of the Rel-15_WUS or values based on the Rel-15_WUS (e.g., an integer multiple). For example, the frequency position may be the same as that of the Rel-15_WUS, or the frequency position of Rel-16_WUS may be determined from the position where the frequency position of Rel-15_WUS is excluded.

For example, in step S3, the terminal 20 may receive, from the base station 10, information about the positions in the time domain and the frequency domain at which the Rel-16_WUS and the Rel-15_WUS, i.e., the legacy WUS, are allocated. The information may be, for example, an index indicating the location in the time domain and the frequency domain, or it may be an index joint-coded with the number of WUS. The index may correspond to a UE group ID.

In step S4, the terminal 20 determines the WUS resource based on the configuration information of the WUS. Subsequently, the terminal 20 starts monitoring of the determined WUS resource (S5). The base station 10 transmits the WUS and paging to the terminal 20, and the terminal 20 receives the WUS on the determined WUS resource and subsequently receives the paging (S6).

By using FIG. 15 through FIG. 21 examples are illustrated where the Rel-16_WUS or the legacy WUS is transmitted from the base station 10 to the terminal 20 on the WUS resource described above, including the case where time domain or frequency domain is extended. Note that FIG. 15 through FIG. 21 include the cases where the legacy WUS is allocated in the WUS resource, respectively, but the legacy WUS need not be allocated in the WUS resource. In step S3 of FIG. 14, the terminal 20 may receive, from the base station 10, information about the positions in the time domain and the frequency domain at which the Rel-16_WUS and the Rel-15_WUS, i.e., the legacy WUS, illustrated in FIG. 15 through FIG. 21 are allocated.

Figure 15:
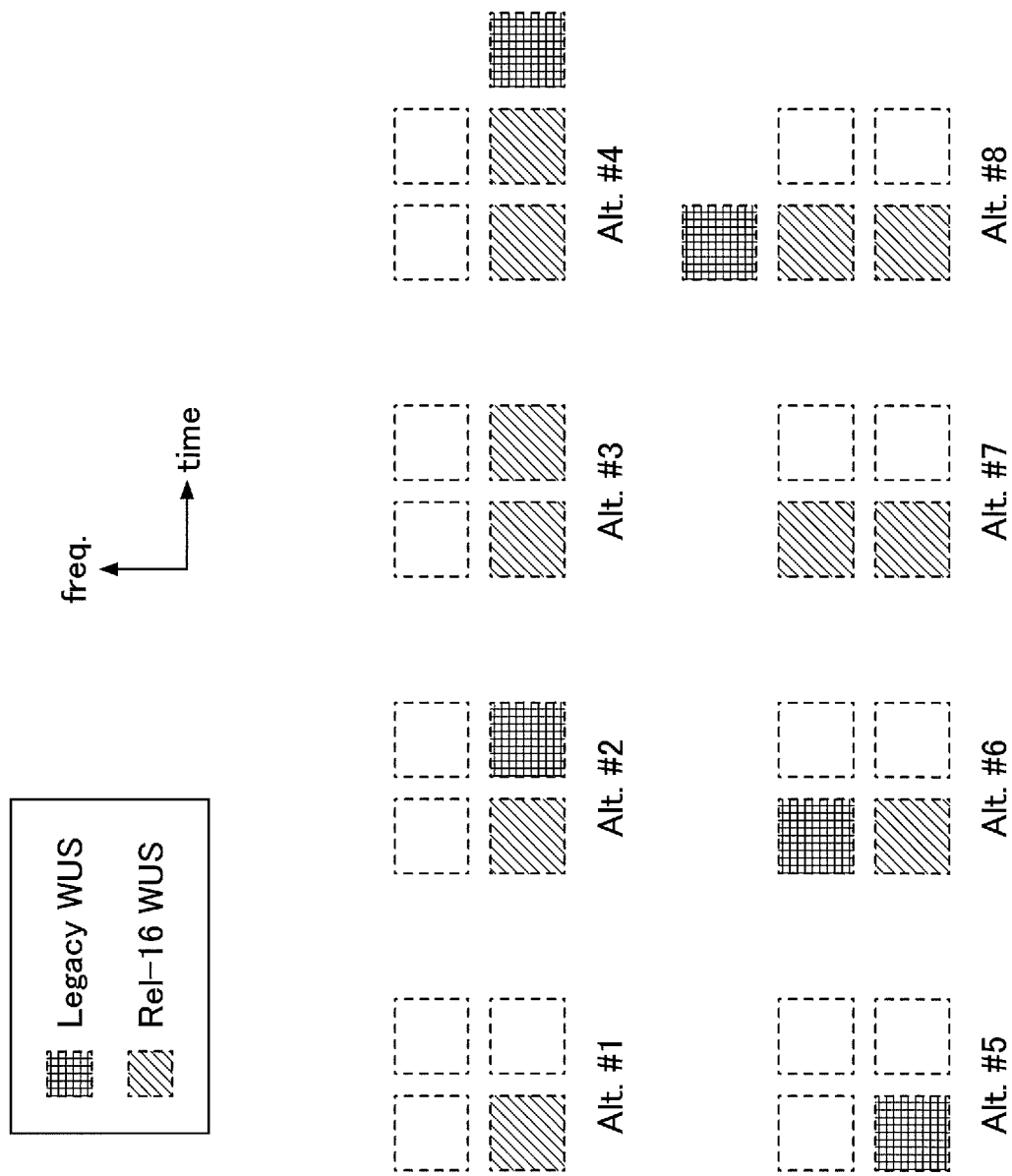
FIG. 15 is a diagram illustrating an example (1) of a WUS arrangement according to an embodiment of the present invention.
Figure 16:
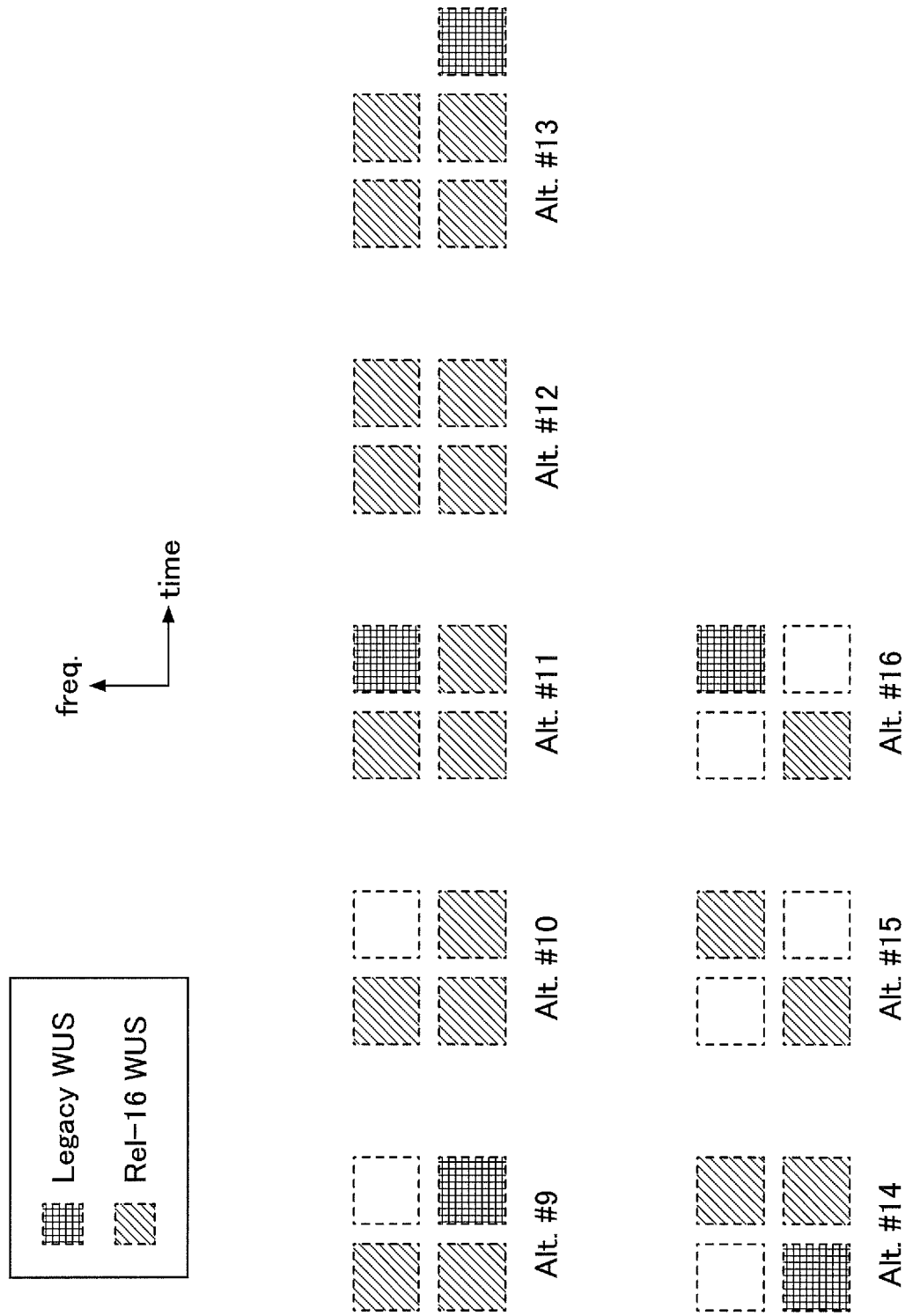
FIG. 16 is a diagram illustrating an example (2) of a WUS arrangement according to an embodiment of the present invention.

FIG. 15 is a diagram illustrating an example (1) of a WUS arrangement according to an embodiment of the present invention. The Rel-16_WUS or the legacy WUS may be allocated in time domain and the frequency domain, such as the following candidate. FIG. 16 illustrates an example in which at most one legacy WUS is arranged, in which up to two Rel-16_WUSs are allocated. For example, as in Alt. #4 or Alt. #8, the legacy WUS may be allocated in the third resource in the time domain or the frequency domain. If legacy WUS is not allocated, the Rel-16_WUS may be arranged in up to two resources in the time domain or in the frequency domain.

For Alt. #n, the allocation of the WUS resources may be reversed in the time domain or in the frequency domain, or rotated 90 degrees, 180 degrees, or 270 degrees on the plane of the time domain and the frequency domain. Hereinafter, for one resource arrangement candidate of Alt. #n, it is assumed that, in (a,b), "a" indicates a resource position in the time domain, and "b" indicates a resource position in the frequency domain.

As in Alt. #1, the Rel-16_WUS may be allocated at (0, 0), without allocating the legacy WUS. As in Alt. #2, the Rel-16_WUS may be allocated at (0,0) and the Legacy WUS may be allocated at (0,1). As in Alt. #3, the Rel-16_WUS may be allocated at (0, 0) and (1,0), without allocating the legacy WUS. As in Alt. #4, the Rel-16_WUS may be allocated at (0,0) and (1,0) and the legacy WUS may be allocated at (2,0).

As in Alt. #5, the legacy WUS may be arranged in (0,0), without allocating the Rel-16_WUS. As in Alt. #6, the Rel-16_WUS may be allocated at (0,0) and the Legacy WUS may be allocated at (0,1). As in Alt. #7, the Rel-16 WUS may be allocated at (0,0) and (0,1), without allocating the legacy WUS. As in Alt. #8, the Rel-16 WUS may be allocated at (0,0) and (0,1) and the legacy WUS may be allocated at (0,2).

FIG. 16 is a diagram illustrating an example (2) of a WUS arrangement according to an embodiment of the present invention. As in Alt. #9, the Rel-16_WUS may be allocated at (0,0) and (0,1) and the legacy WUS may be allocated at (1,0). As in Alt. #10, the Rel-16_WUS may be allocated at (0,0), (1,0) and (0,1), without allocating the legacy WUS. As in Alt. #11, the Rel-16_WUS may be allocated at (0,0), (1,0) and (0,1) and the legacy WUS may be allocated at (1,1). As in Alt. #12, the Rel-16_WUS may be allocated at (0,0), (1,0), (0,1) and (1,1), without allocating the legacy WUS.

As in Alt. #13, the Rel-16_WUS may be allocated at (0,0), (1,0), (0,1) and (1,1) the legacy WUS may be allocated at (2,0). As in Alt. #14, the Rel-16_WUS may be allocated at (1,0) and (1,1) and the legacy WUS may be allocated at (0,0). As in Alt. #15, the Rel-16_WUS may be allocated at (0,0) and (1,1), without allocating the legacy WUS. As in Alt. #16, the Rel-16_WUS may be allocated at (0,0) and the legacy WUS may be allocated at (1,1).

FIG. 17 is a diagram illustrating an example (3) of a WUS arrangement according to an embodiment of the present invention. In FIG. 17, the legacy WUS and the Rel-16_WUS may be allocated in the same resource, for example by CDM.

As in Alt. #17, the legacy WUS and the Rel-16_WUS may be allocated at (0,0). As in Alt. #18, the Legacy WUS and the Rel-16_WUS may be allocated at (0,0) and the Rel-16_WUS may be allocated at (1,0). As in Alt. #19, the legacy WUS and the Rel-16_WUS may be allocated at (0,0) and the Rel-16_WUS may be allocated at (0,1). As in Alt. #20, the legacy WUS and the Rel-16_WUS may be allocated at (0,0) and the Rel-16_WUS may be allocated at (0,1), (1,0) and (1,1). As in Alt. #21, the legacy WUS and the Rel-16_WUS may be allocated at (1,0) and the Rel-16_WUS may be allocated at (0,0), (0,1) and (1,1).

Figure 18:
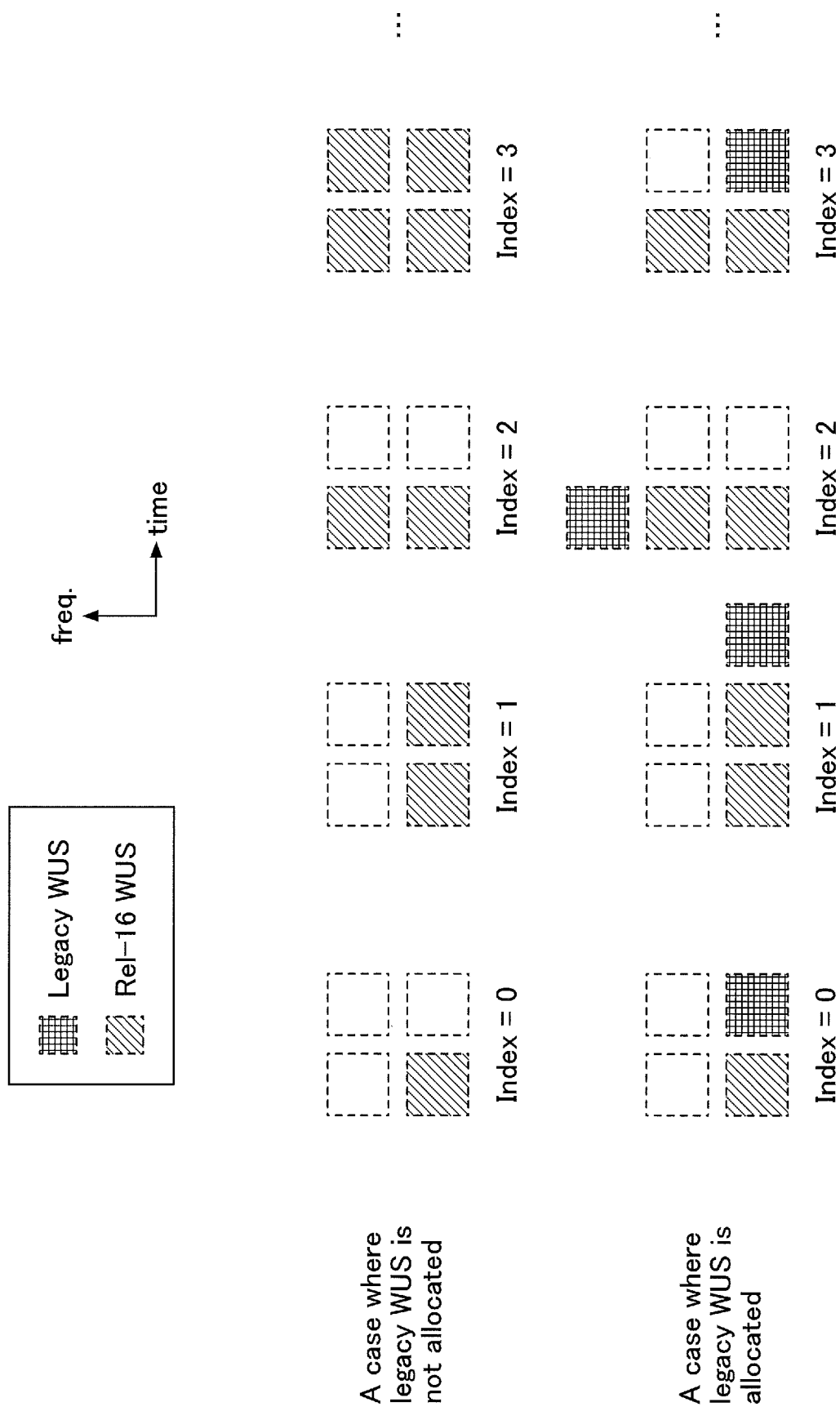
FIG. 18 is a diagram illustrating an example (1) of encoding a WUS arrangement according to an embodiment of the present invention.

FIG. 18 is a diagram illustrating an example (1) of encoding a WUS arrangement according to an embodiment of the present invention. Depending on whether the legacy WUS is allocated, the position in the time domain and the frequency domain of the Rel-16_WUS or the legacy WUS may be determined. The positions of the Rel-16_WUS and/or the legacy WUS in the time domain and the frequency domain and the number of active WUSs may be concatenated and coded (joint-coded), such as the indexes illustrated in FIG. 18. A notification of information indicating whether the legacy WUS is allocated at the resource may be transmitted to the terminal 20 in step S3 of FIG. 14. Depending on whether the legacy WUS is allocated, different WUS arrangements are determined, even if the notification of the same index is transmitted.

For index=n, the arrangement of the WUS resources may be inverted in the time domain or in the frequency domain, or rotated 90 degrees, 180 degrees, or 270 degrees on the plane of the time domain and the frequency domain. Hereinafter, for one resource arrangement candidate of index=n, it is assumed that, in (a,b), "a" indicates a resource position in the time domain, and "b" indicates a resource position in the frequency domain.

In a case where the legacy WUS is not to be allocated, index=0 may indicate that the Rel-16 WUS is allocated at (0,0). Similarly, index=1 may indicate that the Rel-16_WUS is allocated at (0,0) and (1,0). Similarly, index=2 may indicate that the Rel-16_WUS is allocated at (0,0) and (0,1). It may indicate that the Rel-16_WUS is allocated at (0,0), (1,0), (0,1) and (1,1).

In a case where the legacy WUS is allocated, index=0 may indicate that the Rel-16_WUS is allocated (0,0) and the legacy WUS is arranged (1,0). Similarly, index=1 may indicate that the Rel-16_WUS is allocated at (0,0) and (1,0) and the legacy WUS is allocated at (2,0). Similarly, index=2 may indicate that the Rel-16_WUS is allocated at (0,0) and (0,1) and the legacy WUS is allocated at (0,2). Similarly, index=3 may indicate that the Rel-16_WUS is allocated at (0,0) and (0,1) and the legacy WUS is allocated at (1,0).

Figure 19:
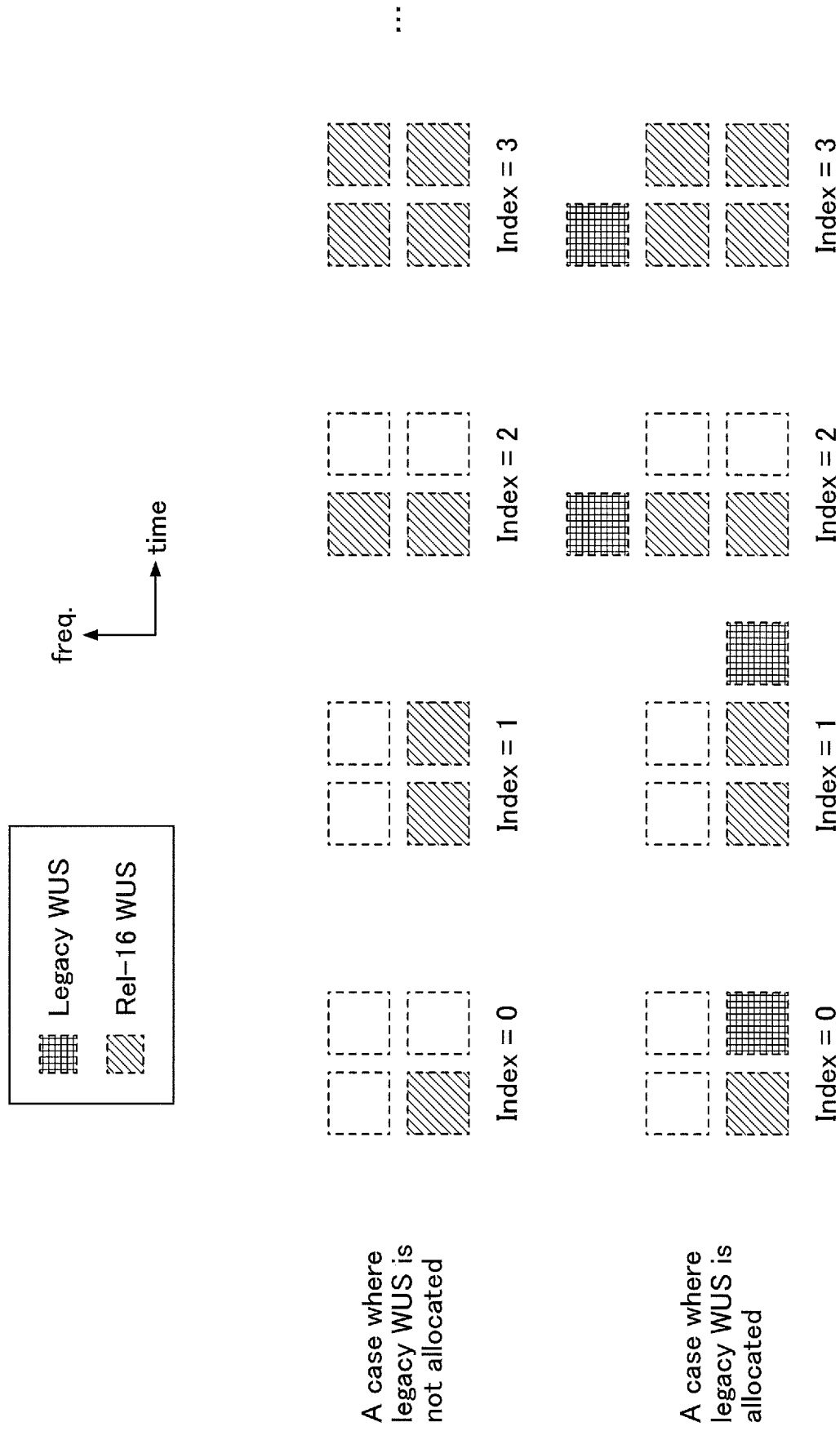
FIG. 19 is a diagram illustrating an example (2) of encoding a WUS arrangement according to an embodiment of the present invention.

FIG. 19 is a diagram illustrating an example (2) of encoding a WUS arrangement according to an embodiment of the present invention. The position in the time domain and the frequency domain at which the legacy WUS is allocated may be determined automatically based on the configuration of the Rel-16_WUS. That is, an explicit notification of the position in the time domain and the frequency domain of the Rel-16_WUS may be transmitted, and an implicit notification the position in the time domain and the frequency domain of the legacy WUS may be transmitted. As illustrated in FIG. 18 and FIG. 19, the terminal 20 may determine the positions in the time domain or in the frequency domain at which the Rel-16 WUS and the legacy WUS are allocated by associating the position in the time domain or in the frequency domain at which the Rel-16 WUS is allocated with the position in the time domain or in the frequency domain at which the legacy WUS is allocated.

In a case where the legacy WUS is not allocated, index=0 may indicate that the Rel-16_WUS is arranged at (0,0). Similarly, index=1 may indicate that the Rel-16_WUS is allocated at (0,0) and (1,0). Similarly, index=2 may indicate that the Rel-16_WUS is allocated at (0,0) and (0,1). Similarly, index=3 may indicate that the Rel-16_WUS is allocated at (0,0), (1,0), (0,1) and (1,1).

In a case where the legacy WUS is allocated, the arrangement of the Rel-16_WUS is identical to that of the case where the legacy WUS is not allocated. Furthermore, if index=0, the legacy WUS may be allocated at (1,0). Similarly, the legacy WUS may be allocated at (2,0) if index=1.

Similarly, if index=2, the legacy WUS may be allocated at (0,2). Similarly, if index=3, the legacy WUS may be allocated at (0,2).

Figure 20:
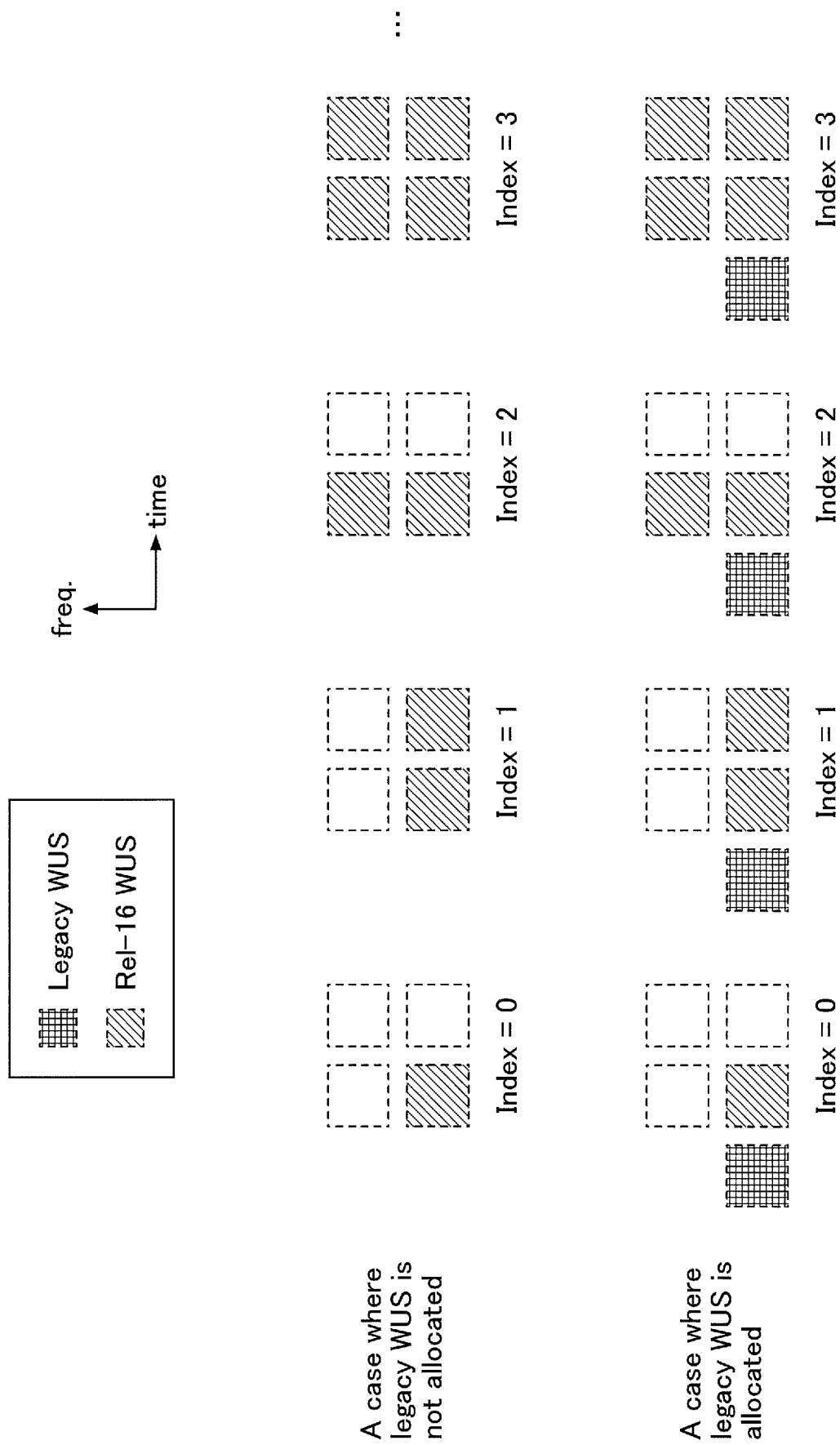
FIG. 20 is a diagram illustrating an example (3) of encoding a WUS arrangement according to an embodiment of the present invention.

FIG. 20 is a diagram illustrating an example (3) of encoding a WUS arrangement according to an embodiment of the present invention. The position in the time domain and the frequency domain at which the legacy WUS is allocated may be determined at a predetermined position regardless of the configuration of the Rel-16_WUS.

In a case where the legacy WUS is not allocated, index=0 may indicate that the Rel-16_WUS is allocated at (0,0). Similarly, index=1 may indicate that the Rel-16_WUS is allocated at (0,0) and (1,0). Similarly, index=2 may indicate that the Rel-16_WUS is allocated at (0,0) and (0,1). Similarly, index=3 may indicate that the Rel-16_WUS is allocated at (0,0), (1,0), (0,1) and (1,1).

In a case where the legacy WUS is allocated, the arrangement of the Rel-16_WUS is identical to that of the case where legacy WUS is not allocated. In addition, the legacy WUS may be allocated at (−1, 0) if index=0, index=1, index=2, or index=3. Alternatively, the legacy WUS may be allocated at (0,0), and the position of the Rel-16_WUS in the case where the legacy WUS is not allocated may be shifted+1 in the direction of time.

Figure 21:
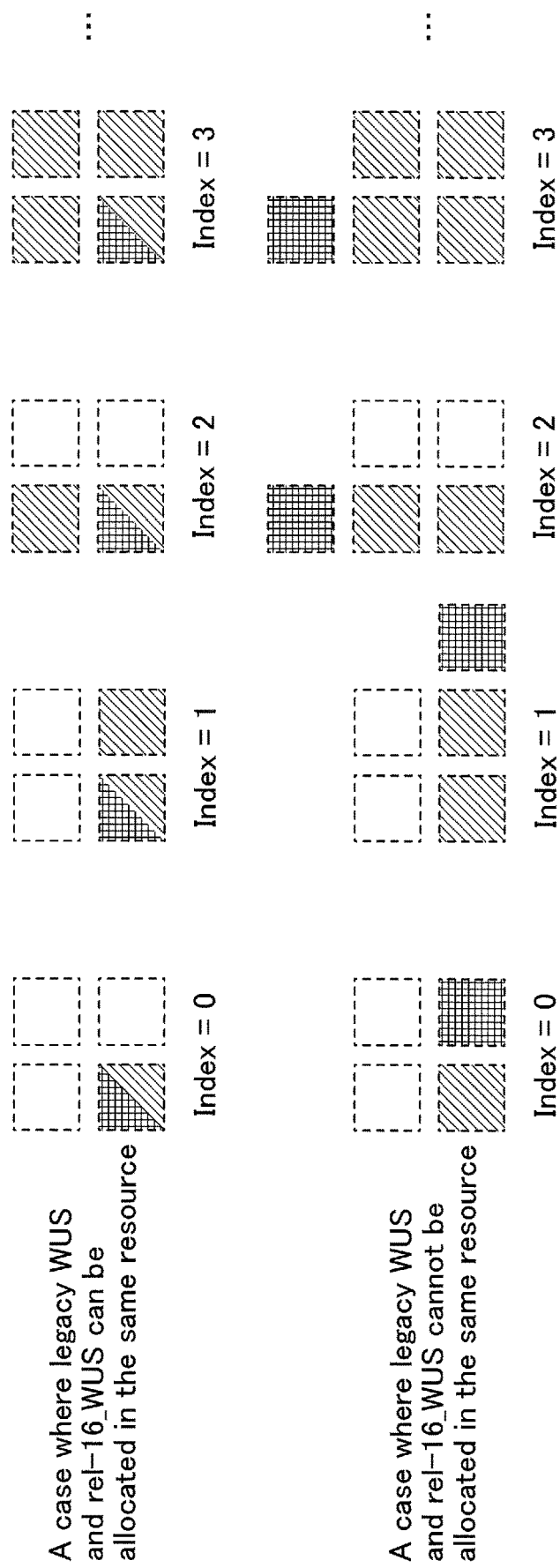
FIG. 21 is a diagram illustrating an example (4) of encoding a WUS arrangement according to an embodiment of the present invention.

FIG. 21 is a diagram illustrating an example (4) of encoding a WUS arrangement according to an embodiment of the present invention. The position in the time domain and the frequency domain at which the legacy WUS is allocated may be identical to the position of the Rel-16_WUS, for example, by using CDM. That is, the resource arrangement of the WUS is determined by whether legacy WUS and Rel-16_WUS can be allocated at the same resource. A notification of information indicating whether the legacy WUS and the Rel-16_WUS can be allocated in the same resource may be transmitted to the terminal 20 in step S3 of FIG. 14. Depending on whether the legacy WUS and the Rel-16_WUS can be allocated in the same resource, different WUS arrangements can be determined even if a notification of the same index is transmitted.

In a case where the legacy WUS and the rel-16_WUS can be allocated in the same resource, index=0 may indicate that the Rel-16_WUS and the legacy WUS are allocated at (0,0). Similarly, index=1 may indicate that the Rel-16_WUS and the Legacy WUS are allocated at (0,0) and the Rel-16_WUS at (1,0). Similarly, index=2 may indicate that the Rel-16_WUS and the Legacy WUS are allocated at (0,0) and the Rel-16_WUS at (0,1). Similarly, index=3 may indicate that the Rel-16_WUS and the Legacy WUS are allocated at (0,0) and the Rel-16_WUS at (1,0), (0,1) and (1,1).

In a case where the legacy WUS and the Rel-16_WUS cannot be allocated in the same resource, index=0 may indicate that the Rel-16_WUS is allocated at (0,0) and the legacy WUS is allocated at (1,0). Similarly, index=1 may indicate that the Rel-16_WUS is allocated at (0,0) and (1,0) and the legacy WUS is allocated at (2,0). Similarly, index=2 may indicate that the Rel-16_WUS is allocated at (0,0) and (0,1) and the legacy WUS is allocated at (0,2). Similarly, index=3 may indicate that the Rel-16_WUS is allocated at (0,0), (1,0), (0,1) and (1,1), and the legacy WUS is allocated at (0,2).

According to the embodiments described above, the base station 10 and the terminal 20 can flexibly allocate a Rel-16_WUS and a legacy WUS in resources in the time domain and the frequency domain.

That is, an activation signal can be flexibly allocated in a radio communication system.

(Device Configurations)

Next, examples of functional configurations of the base station 10 and the terminal 20 for executing the above-described processing and operation are described. The base station 10 and the terminal 20 include functions for executing the above-described embodiments. However, each of the base station 10 and the terminal 20 may only provide with a part of the functions in the embodiments.

<Base Station 10>

Figure 22:
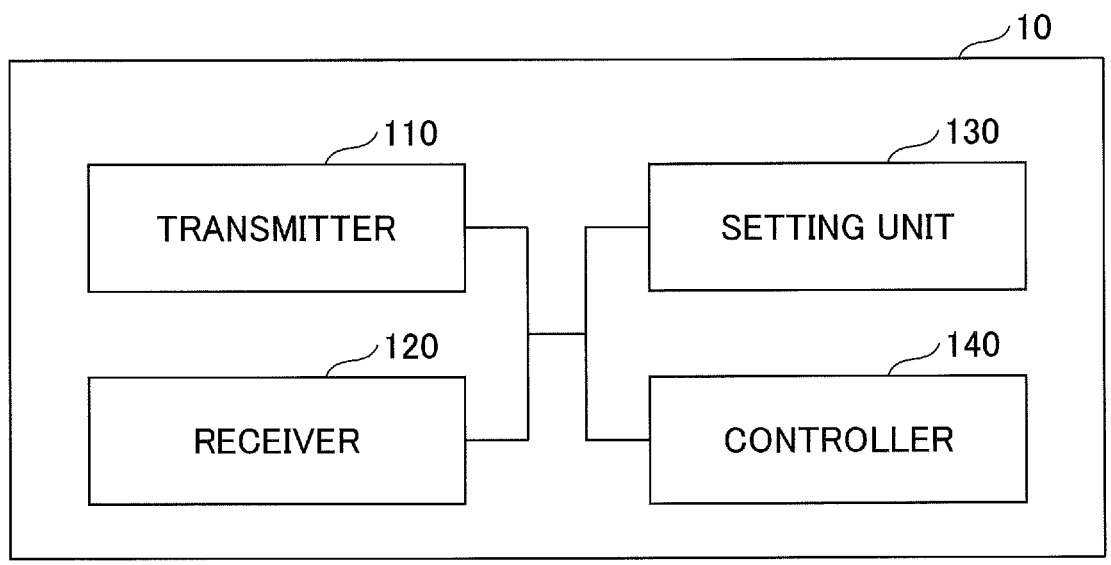
FIG. 22 is a diagram illustrating an example of a functional configuration of a base station 10 according to an embodiment of the present invention.

FIG. 22 is a diagram illustrating an example of a functional configuration of the base station 10 in an embodiment of the present invention. As illustrated in FIG. 22, the base station 10 includes a transmitter 110; a receiver 120; a setting unit 130; and a controller 140. The functional configuration illustrated in FIG. 22 is merely an example. Functional division and names of functional units may be any division and names, provided that operation according to the embodiments of the present invention can be executed.

The transmitter 110 includes a function for generating a signal to be transmitted to the terminal 20 and transmitting the signal through radio. The transmitter 110 transmits an inter network node message to another network node. The receiver 120 includes a function for receiving various signals transmitted from the terminal 20 and retrieving, for example, information of a higher layer from the received signals. The transmitter 110 has a function to transmit NR-PSS, NR-SSS, NR-PBCH, DL/UL control signals, and the like, to the terminal 20. The receiver 120 receives an inter network node message from another network node.

The setting unit 130 stores preconfigured configuration information and various types of configuration information to be transmitted to the terminal 20. Content of the configuration information is, for example, information related to a configuration of WUS transmission and a configuration of paging transmission in accordance with UE capability of the terminal 20.

As described in the embodiments, the controller 140 performs control related to a WUS and paging to be transmitted to the terminal 20. A functional unit related to signal transmission in the controller 140 may be included in the transmitter 110, and a functional unit related to signal reception in the controller 140 may be included in the receiver 120.

<Terminal 20>

Figure 23:
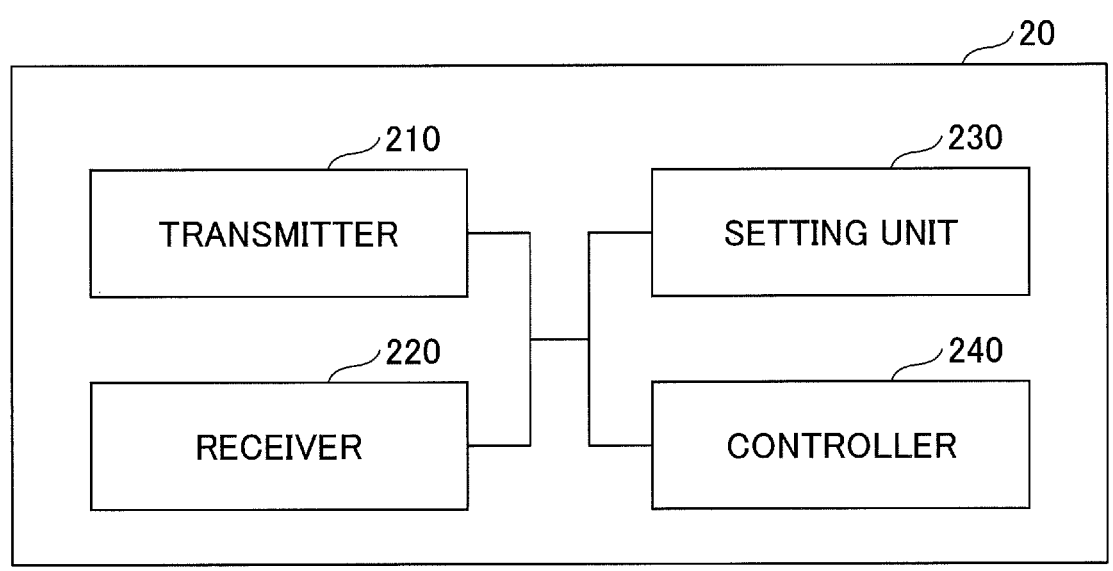
FIG. 23 is a diagram illustrating an example of a functional configuration of a terminal 20 according to an embodiment of the present invention.

FIG. 23 is a diagram illustrating an example of a functional configuration of a terminal 20 according to an embodiment of the present invention. As illustrated in FIG. 23, the terminal 20 includes a transmitter 210; a receiver 220; a setting unit 230; and a controller 240. The functional configuration illustrated in FIG. 23 is only one example. The functional division and the names of the names of the functional units may be any division and names, provided that operations of the embodiments of the present invention can be executed.

The transmitter 210 creates a transmission signal from transmission data and transmits the transmission signal through radio. The receiver 220 receives various signals through radio and retrieves higher layer signals from the received physical layer signals. The receiver 220 has a function to receive NR-PSS, NR-SSS, NR-PBCH, DL/UL/SL control signals, etc., transmitted from the base station 10. For example, the transmitter 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to another terminal 20 as D2D communication, and the receiver 220 receives PSCCH, PSSCH, PSDCH, PSBCH, and the like from another terminal 20.

The setting unit 230 stores various types of configuration information received from the base station 10 by the receiver 220. The setting unit 230 also stores preconfigured configuration information. The content of the configuration information is, for example, information related to a configuration of WUS reception and a configuration of paging reception in accordance with UE capability of the terminal 20.

As described in the embodiments, the controller 240 controls reception of a WUS and paging. A functional unit related to signal transmission in the controller 240 may be included in the transmitter 210, and a functional unit related to signal reception in the controller 240 may be included in the receiver 220.

(Hardware Configuration)

The block diagrams (FIG. 22 and FIG. 23) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 24:
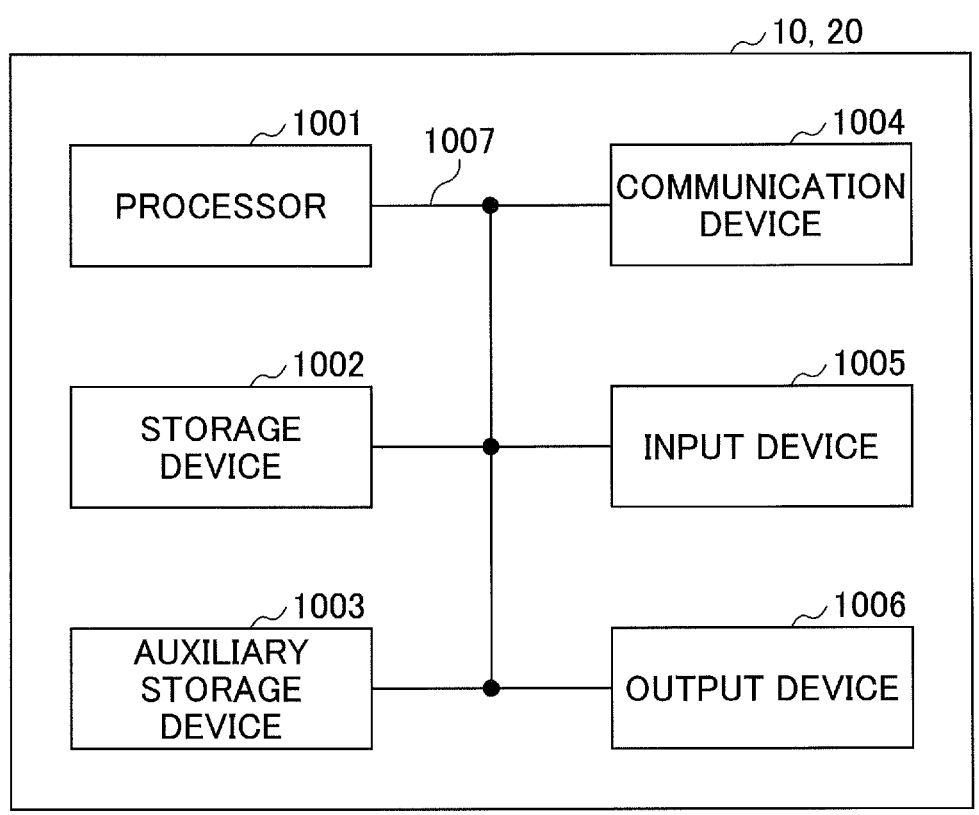
FIG. 24 is a diagram illustrating an example of a hardware configuration of the base station 10 or the terminal 20 according to an embodiment of the present invention.

For example, the base station 10, the terminal 20, or the like in an embodiment of the present invention may function as a computer for performing a process of the radio communication method according to the present disclosure. FIG. 24 is a diagram illustrating an example of a hardware configuration of the base station 10 and the terminal 20 according to an embodiment of the present disclosure. Each of the base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "device" can be replaced with a circuit, device, unit, or the like. The hardware configuration of each of the base station 10 and the terminal 20 may be configured to include each device depicted, or may be configured without including some devices.

Each function in each of the base station 10 and the terminal 20 is implemented such that predetermined software (program) is read on hardware such as the processor 1001, the storage device 1002 and the like, and the processor 1001 performs an operation and controls communication by the communication device 1004 and at least one of reading and writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the above-described controller 140, the controller 240, and the like may be implemented by the processor 1001.

Furthermore, the processor 1001 reads a program (program code), a software module, data, or the like from at least one of the auxiliary storage device 1003 and the communication device 1004 out to the storage device 1002, and executes various types of processes according to them. A program causing a computer to execute at least some of the operations described in the above embodiments is used as the program. For example, the controller 140 of the base station 10 illustrated in FIG. 22 may be implemented by a control program which is stored in the storage device 1002 and operates on the processor 1001. Furthermore, for example, the controller 240 of the terminal 20 illustrated in FIG. 23 may be implemented by a control program which is stored in the storage device 1002 and operates on the processor 1001. Various types of processes are described to be executed by one processor 1001 but may be executed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The above-described storage medium may be, for example, a database, a server, or any other appropriate medium including at least one of the storage device 1002 and the auxiliary storage device 1003.

The communication device 1004 is hardware (a transmitting and receiving device) for performing communication between computers via at least one of a wired network and a wireless network and is also referred to as a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex (TDD). For example, transmitting and receiving antennas, an amplifier, a transceiver, a transmission line interface, and the like may be implemented by the communication device 1004. The transceiver may be implemented such that a transmitter and a receiver are physically or logically separated.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The devices such as the processor 1001 and the storage device 1002 are connected by the bus 1007 to communicate information with each other. The bus 1007 may be configured with a single bus or may be configured with different buses between the devices.

Furthermore, each of the base station 10 and the terminal 20 may be configured to include hardware such as a microprocessor, a digital signal processor (DSP), an application specific integrated circuit (ASIC), a programmable logic device (PLD), or a field programmable gate array (FPGA), or all or some of the functional blocks may be implemented by hardware. For example, the processor 1001 may be implemented by at least one of these pieces of hardware.

Conclusion of the Embodiments

As described above, according to the embodiments of the present invention, there is provided a terminal including a receiver that receives, from a base station, configuration information for at least one of a first activation signal or a second activation signal, the at least one of the first activation signal or the second activation signal being associated with a paging occasion; a controller that determines, based on the configuration information, a first time/frequency domain position of a first resource on which the first activation signal is allocated or a second time/frequency domain position of a second resource on which the second activation signal is allocated; and a communication unit that receives the first activation signal on the first resource or the second activation signal on the second resource and receives, from the base station, paging associated with the received first activation signal or the received second activation signal, wherein the controller determines the first time/frequency domain position of the first resource on which the first activation signal is allocated and the second time/frequency domain position of the second resource on which the second activation signal is allocated by associating the first time/frequency domain position of the first resource on which the first activation signal is allocated with the second time/frequency domain position of the second resource on which the second activation signal is allocated.

According to the above-described configuration, the base station 10 and the terminal 20 can flexibly allocate a Rel-16_WUS and a legacy WUS on a resource in the time domain and the frequency domain. Namely, an activation signal can be flexibly allocated in a radio communication system.

The controller may determine, based on presence or absence of the second activation signal indicated by the configuration information, the first time/frequency domain position of the first resource on which the first activation signal is allocated or the second time/frequency domain position of the second resource on which the second activation signal is allocated. According to this configuration, the terminal 20 can efficiently perform communication by determining a resource at which the Rel-16_WUS and the legacy WUS are allocated.

Furthermore, according to the embodiments of the present invention, there is provided a terminal including a receiver that receives, from a base station, configuration information for at least one of a first activation signal or a second activation signal, the at least one of the first activation signal or the second activation signal being associated with a paging occasion; a controller that determines, based on the configuration information, a first time/frequency domain position of a first resource on which the first activation signal is allocated or a second time/frequency domain position of a second resource on which the second activation signal is allocated; and a communication unit that receives the first activation signal on the first resource or the second activation signal on the second resource and receives, from the base station, paging associated with the received first activation signal or the received second activation signal, wherein the controller determines the first time/frequency domain position of the first resource on which the first activation signal is allocated or the second time/frequency domain position of the second resource on which the second activation signal is allocated based on an index obtained by joint coding a time/frequency domain position of one or more activation signals and a number of the one or more activation signals included in the configuration information.

According to the above-described configuration, the base station 10 and the terminal 20 can flexibly allocate a Rel-16_WUS and a legacy WUS on a resource in the time domain and the frequency domain. Namely, an activation signal can be flexibly allocated in a radio communication system.

The controller may determine the first time/frequency domain position of the first resource on which the first activation signal is allocated or the second time/frequency domain position of the second resource on which the second activation signal is allocated, based on the first time/frequency domain position of the first activation signal explicitly included in the configuration information and the second time/frequency domain position of the second activation signal implicitly included in the configuration information. According to this configuration, the terminal 20 can efficiently perform communication by determining a resource at which the Rel-16_WUS and the legacy WUS are allocated.

The controller may determine the first time/frequency domain position of the first resource on which the first activation signal is allocated or the second time/frequency domain position of the second resource on which the second activation signal is allocated, based on whether the configuration information indicates that the first activation signal and the second activation signal are to be allocated at a same position in the time/frequency domain. According to this configuration, the terminal 20 can efficiently perform communication by determining a resource at which the Rel-16_WUS and the legacy WUS are allocated.

The controller may determine the fixed time domain position or the fixed frequency domain position of the second resource on which the second activation signal is allocated, regardless of a configuration of the first activation signal. According to this configuration, the terminal 20 can efficiently perform communication by determining a resource at which the Rel-16_WUS and the legacy WUS are allocated.

Furthermore, according to the embodiments of the present invention, there is provided a communication method in which a terminal executes a receiving step of receiving, from a base station, configuration information for at least one of a first activation signal or a second activation signal, the at least one of the first activation signal or the second activation signal being associated with a paging occasion; a controlling step of determining, based on the configuration information, a first time/frequency domain position of a first resource on which the first activation signal is allocated or a second time/frequency domain position of a second resource on which the second activation signal is allocated; and a communicating process of receiving the first activation signal on the first resource or the second activation signal on the second resource and receiving, from the base station, paging associated with the received first activation signal or the received second activation signal, wherein the controlling step determines the first time/frequency domain position the first resource on which the first activation signal is allocated and the second time/frequency domain position of the second resource on which the second activation signal is allocated by associating the first time/frequency domain position of the first resource on which the first activation signal is allocated with the second time/frequency domain position of the second resource on which the second activation signal is allocated.

According to the above-described configuration, the base station 10 and the terminal 20 can flexibly allocate a Rel-16_WUS and a legacy WUS on a resource in the time domain and the frequency domain. Namely, an activation signal can be flexibly allocated in a radio communication system.

Supplemental Embodiment

The embodiments of the present invention are described above, but the disclosed invention is not limited to the above embodiments, and those skilled in the art would understand various modified examples, revised examples, alternative examples, substitution examples, and the like. In order to facilitate understanding of the invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (as long as there is no contradiction). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station 10 and the terminal 20 are described using the functional block diagrams, but such devices may be implemented by hardware, software, or a combination thereof. Software executed by the processor included in the base station 10 according to the embodiment of the present invention and software executed by the processor included in the terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any other appropriate storage medium.

Furthermore, a notification of information is not limited to the aspect or embodiment described in the present disclosure and may be provided by any other method. For example, the notification of information may be given by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi(registered trademark)), IEEE 802.16 (WiMAX(registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in this specification may be reversed in order provided that there is no contradiction. For example, the method described in the present disclosure presents elements of various steps with an exemplary order and is not limited to a presented specific order.

In this specification, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Information, a signal, or the like described in the present disclosure may be output from a higher layer (or a lower layer) to a lower layer (or a higher layer layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination in the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in the present disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "base station (BS)," "radio base station," "base station device," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of the base station and the mobile station may be also referred to as a transmitting device, a receiving device, a communication device, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the terminal is replaced with communication between a plurality of terminals 20 (for example, which may be referred to as device-to-device (D2D) or vehicle-to-everything (V2X)). In this case, the terminal 20 may have the functions of the base station 10 described above. Further, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station. In this case, the base station may have the functions of the above-mentioned user terminal. The terms "determination(determining)" and "decision (determining)" used in the present specification may include various types of operations. The "determination" and "decision" may include deeming "judging," "calculating," "computing," "processing," "deriving," "investigating," "looking up (for example, searching in a table, a database, or another data structure)," or "ascertaining" as "determining" and/or "deciding." Furthermore, the "determination" and "decision" may include deeming "receiving (for example, receiving information)," "transmitting (for example, transmitting information)," "inputting," "outputting," or "accessing (for example, accessing data in a memory)" as "determining" and/or "deciding." Furthermore, the "determination" and "decision" may include deeming "resolving," "selecting," "choosing," "establishing," or "comparing" as "determining" and/or "deciding." Namely, the "determination" and "decision" may include deeming an operation as "determining" and/or "deciding." Furthermore, "determining" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case of using in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Furthermore, "means" in the configuration of each of the above devices may be replaced with "unit," "circuit," "device," or the like.

When "include," "including," and variations thereof are used in the present disclosure, these terms are intended to be comprehensive, similar to a term "provided with (comprising)." Further, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a subframe, a slot, a mini slot, and a symbol indicates a time unit for transmitting a signal. As a radio frame, a subframe, a slot, a mini slot, and a symbol, different names corresponding to them may be used.

For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of allocating a radio resource (a frequency bandwidth, a transmission power, or the like which can be used in each terminal 20) to each terminal 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is provided, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Furthermore, a long TTI (for example, a normal TTI, a subframe, or the like) may be replaced with a TTI having a time length exceeding 1 ms, and a short TTI (for example, a reduced TTI or the like) may be replaced with a TTI having a TTI length that is less than a TTI length of a long TTI and that is longer than or equal to 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology.

Furthermore, a time domain of an RB may include one or more symbols and may be a length of one slot, one mini slot, one subframe, or one TTI. One TTI, one subframe, or the like may be formed of one or more resource blocks.

Furthermore, one or more RBs may be referred to as a physical resource block (PRB), a sub carrier group (SCG), a resource element group (REG), a PRB pair, an RB pair, or the like.

Furthermore, the resource block may be formed of one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and the UE need not assume that predetermined signals/channels are transmitted and received outside an active BWP. Furthermore, a "cell," a "carrier," or the like in the present disclosure may be replaced with a "BWP."

Structures of the radio frame, the sub frame, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the present disclosure, for example, when an article such as "a," "an," or "the" in English is added by a translation, the present disclosure may include a case in which a noun following the article is the plural.

In the present disclosure, a term "A and B are different" may mean "A and B are different from each other." Furthermore, the term may mean "each of A and B is different from C." Terms such as "separated," "coupled," or the like may also be interpreted similarly to "different."

Each aspect/embodiment described in this specification may be used alone, in combination, or may be switched in accordance with the execution.

Furthermore, notification of predetermined information (for example, notification of "being X") is not limited to notification performed explicitly, but may be performed implicitly (for example, not notifying the predetermined information).

Note that, in the present disclosure, the PO is an example of a paging occasion. The WUS is an example of an activation signal. The Rel-16_WUS is an example of a first activation signal. The legacy WUS or the Rel-15_WUS is an example of a second activation signal. The transmitter 210 or the receiver 220 is an example of a communication unit. The transmitter 110 or the receiver 120 is an example of a communication unit.

Although the present disclosure is described above in detail, it is obvious to those skilled in the art that the present disclosure is not limited to the embodiments described in the present disclosure. The present disclosure may be implemented as revised and modified embodiments without departing from the gist and scope of the present disclosure as set forth in claims.

Accordingly, the description of the present disclosure is for the purpose of illustration and does not have any restrictive meaning to the present disclosure.

LIST OF REFERENCE SYMBOLS

10 base station
110 transmitter
120 receiver
130 setting unit
140 controller
20 terminal
210 transmitter
220 receiver
230 setting unit
240 controller
1001 processor
1002 storage device
1003 auxiliary storage device
1004 communication device
1005 input device
1006 output device

The invention claimed is:

1. A terminal comprising:
a receiver that receives, from a base station, configuration information of an activation signal, the activation signal being associated with one or more paging occasions;
a controller that determines a position in a time domain and a frequency domain of a resource at which a first activation signal and a second activation signal are allocated, based on information indicating a time domain position of the second activation signal included in the configuration information when the configuration information does not include information indicating a time domain position of the first activation signal; and
a communication unit that monitors one or more paging occasions associated with the first activation signal upon receiving the first activation signal on the resource, and monitor one or more paging occasions associated with the second activation signal upon receiving the second activation signal on the resource.

2. A base station comprising:
a transmitter that transmits, to a terminal, configuration information of an activation signal, the activation signal being associated with one or more paging occasions;
a controller that determines a position in a time domain and a frequency domain of a resource at which a first activation signal and a second activation signal are allocated, based on information indicating a time domain position of the second activation signal included in the configuration information when the configuration information does not include information indicating a time domain position of the first activation signal; and
a communication unit that transmits paging at one or more paging occasions associated with the first activation signal upon receiving the first activation signal on the resource, and transmits one or more paging occasions associated with the second activation signal upon receiving the second activation signal on the resource.

3. A communication method executed by a terminal, the method comprising:
receiving, from a base station, configuration information of an activation signal, the activation signal signal being associated with one or more paging occasions;
determining a position in a time domain and a frequency domain of a resource at which a first activation signal or a second activation signal are allocated, based on information indicating a time domain position of the second activation signal included in the configuration information when the configuration information does not include information indicating a time domain position of the first activation signal; and
monitoring one or more paging occasions associated with the first activation signal upon receiving the first activation signal on the resource, and monitoring one or more paging occasions associated with the second activation signal upon receiving the second activation signal on the resource.

4. A communication system comprising:
a base station; and
a terminal,
wherein the base station includes:
- a transmitter that transmits, to a terminal, configuration information of an activation signal, the activation signal being associated with one or more paging occasions;
and wherein the terminal includes:
- a receiver that receives, from a base station, the configuration information of the activation signal, the activation signal being associated with one or more paging occasions;
- a controller that determines a position in a time domain and a frequency domain of a resource at which a first activation signal and a second activation signal are allocated, based on information indicating a time domain position of the second activation signal included in the configuration information when the configuration information does not include information indicating a time domain position of the first activation signal; and
- a communication unit that monitors one or more paging occasions associated with the first activation signal upon receiving the first activation signal on the resource, and monitors one or more paging occasions associated with the second activation signal upon receiving the second activation signal on the resource.

\* \* \* \* \*